(12) United States Patent
Clark

(10) Patent No.: US 6,345,243 B1
(45) Date of Patent: Feb. 5, 2002

(54) SYSTEM, METHOD, AND PRODUCT FOR DYNAMICALLY PROPAGATING TRANSLATIONS IN A TRANSLATION-MEMORY SYSTEM

(75) Inventor: Jonathan P. Clark, Ashland, MA (US)

(73) Assignee: Lionbridge Technologies, Inc., Waltham, MA (US)

( * ) Notice: Subject to any disclaimer, the term of this patent is extended or adjusted under 35 U.S.C. 154(b) by 0 days.

(21) Appl. No.: 09/085,468

(22) Filed: May 27, 1998

(51) Int. Cl.[7] .............................................. G06F 17/28
(52) U.S. Cl. ............................................. 704/2; 704/7
(58) Field of Search .................. 704/2–8, 10; 707/530, 707/536

(56) References Cited

U.S. PATENT DOCUMENTS

| | | | | |
|---|---|---|---|---|
| 5,477,450 A | * | 12/1995 | Takeda et al. ................. | 704/2 |
| 5,510,981 A | * | 4/1996 | Berger et al. .................. | 704/2 |
| 5,528,491 A | * | 6/1996 | Kuno et al. .................... | 704/9 |
| 5,677,835 A | * | 10/1997 | Crbonell et al. ............... | 704/9 |
| 5,724,593 A | * | 3/1998 | Hargrave, III et al. .......... | 704/2 |
| 5,787,386 A | * | 7/1998 | Kaplan et al. ................. | 704/9 |
| 5,805,832 A | * | 9/1998 | Brown et al. .................. | 704/2 |
| 5,826,220 A | * | 10/1998 | Takeda et al. ................. | 704/2 |
| 5,850,561 A | * | 12/1998 | Church et al. ................. | 704/10 |
| 5,867,811 A | * | 2/1999 | O'Donoghue ................. | 704/10 |
| 5,893,134 A | * | 4/1999 | O'Donoghue et al. ......... | 704/2 |
| 5,907,821 A | * | 5/1999 | Kaji et al. ..................... | 704/2 |

* cited by examiner

Primary Examiner—Patrick N. Edouard
(74) Attorney, Agent, or Firm—Wolf, Greenfield & Sacks, P.C.

(57) ABSTRACT

A computer-implemented system, method, and product are provided to propagate an externally produced translation of a first occurrence of a word, phrase, or other group of characters to be translated (referred to herein as a "translatable source segment") in a first source file to at least one occurrence of a corresponding target segment in one or more target files of a target project. The corresponding target segment corresponds with a second occurrence of the translatable source segment in any of the one or more source files. The source files may have the same file format, or two or more of the source files may have different file formats. Also, two or more source files may have character formats that are different from each other, and/or they may be written in different languages. In one implementation, the propagator propagates the externally produced translation to all corresponding target segments in the target project that correspond with the translatable source segment. Also, the propagator may propagate the externally produced translation to user-selected corresponding target segments in the target project that corresponds with the translatable source segment. The externally produced language translation may be generated by a human translator, or by a machine translation tool. In one embodiment, the externally produced language translation is derived from a legacy file. Also, the externally produced language translation may be derived from a corresponding target segment that corresponds with the translatable source segment.

59 Claims, 18 Drawing Sheets

| Syntax of Source File 410A and Corresponding Target File 420A Expressed in BNF Form ||
|---|---|
| 612 Rule | 614 Production |
| 612A-1 File | 614A-1 (Dialog)* |
| 612B-1 Dialog | 614B-1 Header Body |
| 612C-1 Header | 614C-1 id.attr'dialog' |
| 612D-1 id.attr | 614D-1 (0-9)+ |
| 612E-1 Body | 614E-1 'begin'(Item)* 'end' |
| 612F-1 Item | 614F-1 type.attr id.attr text.store |
| 612G-1 type-attr | 614G-1 (a-z)+ |
| - - - - - | - - - - - |
| 612A-7 File | 614A-7 (Dialog)* |
| 612B-7 Dialog | 614B-7 Header Body |
| 612C-7 Header | 614C-7 id.attr'dialog' |
| 612D-1 id.attr | 614D-1 (0-9)+ |
| 612E-7 Body | 614E-7 'begin'(Item)* 'end' |
| 612F-7 Item | 614F-7 type.attr id.attr text.store |
| 612G-1 type-attr | 614G-1 (a-z)+ |

Syntax of Files 410A and 420A

Syntax of Files 410H and 420H

514 Target Segment and Attribute List

| 660 Corresponding Target Segment | 665 Corresponding Attribute Identifier and Supporting Target Segments |
|---|---|
| 660-1 Segment 420A-1 ("Delete") | 665-1 Attribute Information for Segment 420A-1 |
| ... | ... |
| 660-7 Segment 420H-7 ("Are you sure you want to delete?") | 665-7 Attribute Information for Segment 420H-7 |

Segment 420A-1 ↔ | Segment 420H-7 ↔

FIG. 6B

512 Source Segment and Attribute List

| 650 Translatable Source Segment | 655 Corresponding Attribute Identifier and Supporting Source Segments |
|---|---|
| 650-1 Segment 410A-1 ("Delete") | 655-1 Attribute Information for Segment 410A-1 |
| ... | ... |
| 650-7 Segment 410H-7 ("Are you sure you want to delete?") | 655-7 Attribute Information for Segment 410H |

Segment 410A-1 ↔ | Segment 410H-7 ↔

| 336 Merged Source-Target Database ||
|---|---|
| 760A<br>410A-1 Size | 765A<br>410A-1 Trans. Source Segment |
| 770A<br>420A-1 Size | 775A<br>420A-1 Corr. Target Segment |
| 780A<br>410A-1 Pr. Fl. | 785A<br>410A-1 UA1 + Other Attributes |
| 790A<br>410A-1 Source File Information ||
| 795A<br>420A-1 Target File Information ||
| 798A<br>Pointer to Page of Occurrence Book 1022 ||
| - - - - - ||
| 760B<br>410H-9 Size | 765B<br>410H-9 Trans. Source Segment |
| 770B<br>420H-9 Size | 775B<br>420H-9 Corr. Target Segment |
| 780B<br>410H-9 Pr. Fl. | 785B<br>410H-9 UAl + Other Attributes |
| 790B<br>410H-9 Source File Information ||
| 795B<br>420H-9 Target File Information ||
| 798B<br>Pointer to Page of Occurrence Book 1022 ||

Record for 410A-1 / 420A-1 Pair

Record for 410H-9 / 420H-9 Pair

FIG. 7C

SYSTEM, METHOD, AND PRODUCT FOR DYNAMICALLY PROPAGATING TRANSLATIONS IN A TRANSLATION-MEMORY SYSTEM

RELATED APPLICATION

The following application is related to the present application.

U.S. patent application Ser. No. 09/085,471, entitled "SYSTEM, METHOD, AND PRODUCT FOR DYNAMICALLY ALIGNING TRANSLATIONS IN A TRANSLATION-MEMORY SYSTEM,", naming as inventor Jonathan Clark, assigned the assignee of the present invention and filed concurrently herewith.

BACKGROUND OF THE INVENTION

1. Field of the Invention

The present invention relates generally to language translation and, more particularly, to translation-memory tools.

2. Related Art

Technology-driven industries have increasingly relied upon translation, localization and related services to bring products to the global markets. The need to quickly and efficiently create foreign language versions of products has increased dramatically as global competition increases, upgrades are developed and released more frequently, and the time in which products become obsolete decreases.

Historically, the expertise of language translators, engineers and publishers have been utilized to translate a document from a source to a target language. More recently, advances in computer software and hardware have enabled the growth of processor-based language translation tools. Traditionally, two types of language translation tools generally have been available: machine-translation tools and translation-memory tools (also referred to herein as translation memory systems).

Generally, machine translation tools use natural language translation techniques to perform language translation; accordingly, they are also referred to as natural language translation tools. Machine-translation tools perform in-depth morphological, grammatical, syntactical and some semantical analysis of text written in a source language. The machine translation tool then attempts to parse the source language into a target language using extensive glossaries and a complex set of linguistic rules. However, despite the many types of machine-translation tools that so far have been developed, there are a number of limitations that have prevented machine-translation tools from being fully successful.

First, machine-translation systems are expensive to set up, operate and maintain. Furthermore machine translation typically performs below publication-grade translation, even when operating under optimal conditions. As a result, machine-translation has been proven to be effective only when used to translate very controlled input text. However, this is time consuming and expensive since providing such controlled input generally requires careful planning.

Translation memory tools are software programs that recycle existing translations provided by a human translator-operator. Conventional translation memory tools generally utilize well-known text search and replace methodologies to perform language translation. For each file in a group of files, referred to herein as a project, translation memory tools contain a database of text strings that are to be translated. The user-operator searches for a particular string throughout a text file and, for each occurrence, replaces the found string with a translated text. Generally, the translation memory tools are utilized when the input files include text having substantial duplication of text strings, such as in technical texts, or when upgrades are performed.

Although translation memory tools overcome the computational burdens of machine translation tools, there are a number of problems with translation memory tools that compromise their effectiveness in today's rapidly changing global markets. One such drawback to conventional translation memory tools is that typically they are completely manual; that is, the operator must provide all of the target language translations. Unfortunately, the time involved in providing such translations is extensive, making it difficult to translate a document efficiently and cost-effectively. To reduce this burden, some conventional translation memory tools provide techniques to address multiple occurrences of a given text string in the file being translated. However, these systems still require the operator to manually address each occurrence of the text string. In addition, the operator must perform the same functions in each of the files in a project.

Another drawback to conventional translation memory tools is that the integrity of the translation is dependent upon each operator entry. This drawback makes such systems sensitive to inconsistent translations provided by the same user-operator over time as well as by different translator-operators. Furthermore, this drawback often yields a translated text which is either incorrect, misleading or at least inconsistent with itself.

What is needed, therefore, is a translation memory tool that accurately translates text quickly and efficiently and is not sensitive to variations in the source language or to different operators.

SUMMARY OF THE INVENTION

To overcome these and other drawbacks of conventional language translation systems, the present invention, in one embodiment, is a propagator for a translation memory system. The propagator propagates an externally produced translation of a first occurrence of a word, phrase, or other group of characters to be translated (referred to herein as a "translatable source segment") in a first source file to at least one occurrence of a corresponding target segment in one or more target files of a target project. The corresponding target segment corresponds with a second occurrence of the translatable source segment in any of the one or more source files. The source files may have the same file format, or two or more of the source files may have different file formats. Also, two or more source files may have character formats that are different from each other, and/or they may be written in different languages. In one implementation, the propagator propagates the externally produced translation to all corresponding target segments in the target project that correspond with the translatable source segment. Also, the propagator may propagate the externally produced translation to user-selected corresponding target segments in the target project that corresponds with the translatable source segment.

The externally produced language translation may be generated by a human translator, or by a machine translation tool. In one embodiment, the externally produced language translation is derived from a legacy file. Also, the externally produced language translation may be derived from a corresponding target segment that corresponds with the translatable source segment.

In one embodiment, the invention is a translation memory system for translating translatable source segments in one or more source files of a source project. The translation memory system includes a propagator that propagates an externally produced translation of a first occurrence of a translatable source segment in a first source file to at least one occurrence of a corresponding target segment in one or more target files of a target project. The corresponding target segment corresponds with a second occurrence of the translatable source segment in any of the one or more source files.

In one embodiment, the invention is a translation memory system for translating translatable source segments in one or more source files of a source project and storing the translated translatable source segments in corresponding target segments of one or more target files of a target project. The translation memory system includes a propagator that associates source-target pairs in a source-target database. Each source-target pair includes a translatable source segment and a corresponding target segment. The corresponding target segment corresponds with the translatable source segment, and all translatable source segments of the associated source-target pairs are sufficiently similar to each other that they may be translated by the same externally produced translation. The translatable source segments may be sufficiently similar because they are the same, or they may be morphologically similar. In one implementation the propagator propagates the externally produced translation of the translatable source segment to each corresponding target segment that is paired with the translatable source segment in one or more of the source-target pairs.

In one implementation, the associated source-target pairs are associated by a pointer that points from each associated source-target pair to a page in a pair-occurrence pointer book. Each page of the book has a second set of one or more pointers that each point back to one associated source-target pair. The translatable source segments of each associated source-target pair pointed to by each of the second set of pointers of each page are sufficiently similar to each other that they may be translated by the same externally produced translation. In one aspect, each page is separately addressable by, and/or distributable to, two or more user-translators. Advantageously, each page thus may be separately provided to, and operated upon by, groups of users in differing locations using groups of computers that need not be linked.

In one implementation, each source-target pair is stored in a record of the source-target database. Each record may have an indicator indicating whether an externally produced translation of the translatable source segment of the record is to be propagated to the corresponding target segment of the record. Also, each record may have a pointer to a page in a pair-occurrence pointer book, wherein each page has a second set of one or more pointers that each point back to one of the associated source-target-pair records. The translatable source segments of each associated source-target-pair record pointed to by each of the second set of pointers are sufficiently similar to each other that they may be translated by the same externally produced translation.

In one implementation, the propagator includes a leverager that matches at least one legacy translatable source segment in a legacy file with at least one translatable source segment in the source-target database. The leverager also generates a corresponding target segment that corresponds with the translatable source segment, such that the generated corresponding target segment is a copy of a legacy corresponding target segment that corresponds with the at least one legacy translatable source segment.

The propagator may also include an inconsistent translation resolver and propagation flag setter that searches each source-target pair pointed to by each pointer in pages of a pair-occurrence pointer book. A conflict is identified when one corresponding target segment of a source-target pair pointed to by a first pointer of one page is different than another corresponding target segment of another source-target pair pointed to by another pointer of the same page, provided, in one implementation, that user-determined propagation indicators associated with such source target pairs are enabled. The propagation indicator indicates if an externally produced translation of the translatable source segment should be propagated to the corresponding target segment.

In one embodiment, the invention is a method for translating translatable source segments in one or more source files of a source project to generate corresponding target segments of one or more target files of a target project. The method includes: (1) associating at least one source-target pair in a source-target database (wherein each source-target pair includes a translatable source segment and a corresponding target segment, the corresponding target segment corresponds with the translatable source segment, and all translatable source segments of the associated at least one source-target pairs are sufficiently similar to each other that they are translated by a same externally produced translation); and (2) propagating an externally produced translation of the translatable source segment to each corresponding target segment that is paired with the translatable source segment in one or more of the source-target pairs. In one implementation, step (1) of the method includes: (a) generating a pointer to associate the associated source-target pairs, such that the pointer points from each associated source-target pair to a page in a pair-occurrence pointer book; and (b) generating for each page one or more of a second set of pointers that each point back to one associated source-target pair, such that the translatable source segments of each associated source-target pair pointed to by each of the second set of pointers of each page are sufficiently similar to each other that they are translated by a same externally produced translation. Each page may be separately addressable by, and/or distributable to, two or more user-translators.

In one embodiment, the invention is a computer system having at least one processor and a propagator that cooperates with the at least one processor to propagate an externally produced translation of a first occurrence of a translatable source segment in a source file to at least one occurrence of a corresponding target segment in one or more target files of a target project. The corresponding target segment corresponds with a second occurrence of the translatable source segment in any of the source files.

In one embodiment, the invention is a computer system having at least one processor and a translation memory system. The translation memory system cooperates with the processor to translate translatable source segments in one or more source files of a source project and store the translated translatable source segments in corresponding target segments of one or more target files of a target project. The propagator associates at least one of source-target pairs in a source-target database, wherein each source-target pair includes a translatable source segment and a corresponding target segment. The corresponding target segment corresponds with the translatable source segment, and all translatable source segments of the associated source-target pairs are sufficiently similar to each other that they are translated by a same externally produced translation.

In one embodiment, the invention is storage media that contains software that, when executed on an appropriate computing system, performs a method for translating translatable source segments in one or more source files of a source project to generate corresponding target segments of one or more target files of a target project. The method includes: (1) associating at least one source-target pair in a source-target database, wherein each source-target pair includes a translatable source segment and a corresponding target segment (the corresponding target segment corresponds with the translatable source segment, and all translatable source segments of the associated source-target pairs are sufficiently similar to each other that they are translated by a same externally produced translation); and (2) propagating the externally produced translation of the translatable source segment to each corresponding target segment that is paired with the translatable source segment in one or more of the source-target pairs.

In one embodiment, the invention is a computer program product for use with an appropriate computing system. The computer program product includes a computer usable medium having embodied therein computer readable program code method steps for translating translatable source segments in one or more source files of a source project to generate corresponding target segments of one or more target files of a target project. The method steps include: (1) associating at least one source-target pair in a source-target database, wherein each source-target pair includes a translatable source segment and a corresponding target segment (the corresponding target segment corresponds with the translatable source segment, and all translatable source segments of the associated source-target pairs are sufficiently similar to each other that they are translated by a same externally produced translation); and (2) propagating the externally produced translation of the translatable source segment to each corresponding target segment that is paired with the translatable source segment in one or more of the source-target pairs.

In a further embodiment, the invention is a method for translating translatable source segments in one or more source files of a source project to generate corresponding target segments of one or more target files of a target project. The method includes: (1) associating translatable source segments extracted from at least one source file with corresponding target segments extracted from at least one target file having the same format, such association being based upon commonality of attributes of the segments; and (2) propagating an externally produced translation of a first occurrence of a translatable source segment to at least one occurrence of a corresponding target segment, wherein the corresponding target segment is associated in step (1) with the translatable source segment.

Advantageously, the present invention enables the memory translation system to essentially recycle existing translations (performed by human or machine translators) in projects where substantial duplication exists and when upgrades are performed. Advantageously, the invention may operate upon any known, or to be developed, type of file, file format, or character format.

BRIEF DESCRIPTION OF FIGURES

The above and further advantages of the present invention will be more clearly appreciated from the following detailed description when taken in conjunction with the accompanying drawings, in which like reference numerals indicate like structures or method steps, in which the left-most one or two digits of a reference numeral indicate the number of the figure in which the referenced element first appears (for example, the element 210 appears first in FIG. 2, the element 1110 appears first in FIG. 11), solid lines generally indicate control flow, dotted lines generally indicate data flow, and wherein:

FIG. 6A is a partial schematic diagram of one illustrative embodiment of a source file such as may be included in the source project of FIG. 4A;

FIG. 6B is a partial schematic diagram of one illustrative embodiment of a source segment and attribute list into which one embodiment of a segment parser and attribute generator of the parser-extractor of FIG. 5 may store translatable source segments and associated information derived from the illustrative source file of FIG. 6A;

FIG. 6C is a partial schematic diagram of one illustrative embodiment of a target segment and attribute list into which one embodiment of a segment parser and attribute generator of the parser-extractor of FIG. 5 may store corresponding target segments and associated information derived from an illustrative target file of the target project of FIG. 4A;

FIG. 7C is a partial schematic diagram of one illustrative embodiment of a merged source-target database into which one embodiment of an aligner of the translation memory system of FIG. 3 may store source-target pairs and associated information derived from the illustrative translatable source segment database of FIG. 7A and the illustrative corresponding target segment database of FIG. 7B;

DETAILED DESCRIPTION

Figure 1:
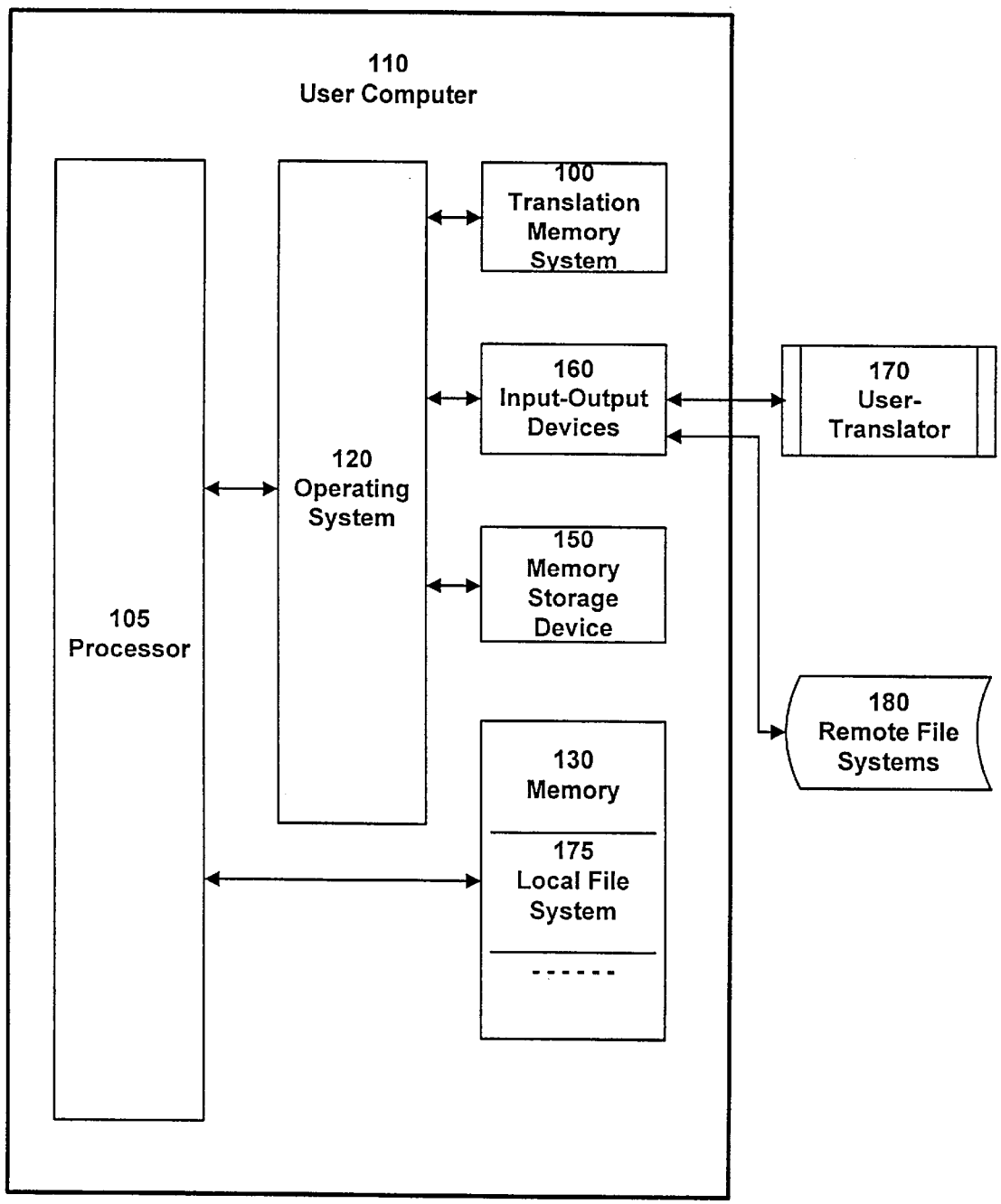
FIG. 1 is a simplified functional block diagram of one embodiment of a computer system environment in which embodiments of a translation memory system of the present invention may be implemented.

The attributes of the present invention and its underlying method and architecture will now be described in greater detail with reference to one embodiment of the invention, referred to herein as translation memory system 100. For each source-target pair in a project, translation memory system 100 dynamically propagates translations of translatable source segments to all corresponding target segments in the project. In one embodiment, translation memory system 100 performs this function by: (a) aligning translatable source segments with their corresponding target segments; (b) updating the translatable source segments based on legacy data structures, if available; (c) presenting source-target pairs to user-translator 170 to edit the corresponding target segments provided by the legacy data structures if appropriate, or to generate corresponding target segments that are translations in the target language of the translatable source segments; and (d) propagating the translations so edited or generated to all corresponding target segments in the project. In one implementation, a translatable source segment that may occur multiple times in the source project is presented only once to user-translator 170 for editing or generation of a translation.

For clarity, following is a glossary of terms used with a particular meaning in describing the functions, elements, and processes of translation memory system 100. Some of such terms are defined at greater length below.

"Align" means to correlate a source segment with an associated target segment.

"BNF form" refers to a known context-free grammar notation commonly used for describing the syntax of programming languages. As used herein, the term is more particularly directed to the notation of rules specifying the syntax of source and target files of various file types.

"Corresponding target segment" means a target segment that corresponds to a translatable source segment. A corresponding target segment may be a copy of a translatable source segment, it may be a translation of the translatable source segment derived from legacy data structures, or it may be a translation of the translatable source segment generated by an external translator and propagated by the translation memory system.

"File" means all or part of a file, document, spreadsheet, data structure, or other collection of segments in any format or language and suitable for reading on any kind of computer platform.

"Language" means a language used by people in ordinary discourse (such as English or Spanish) and is also used herein to include mathematical and other symbols; languages used by machines, such as hypertext markup language; and any other communication using character strings.

"Legacy file" means a source file (referred to as a legacy source file) and a corresponding target file (referred to as a legacy target file) wherein: (a) one or more translatable source segments have been translated and stored in a corresponding target segment; (b) the translatable source segments are morphologically equivalent (or morphologically similar in alternative embodiments) to associated translatable source segments in a source file of the project (referred to as a project source file); and, the target language into which the translatable source segments of the legacy source file have been translated is the same as the target language into which the associated translatable source segments of the project source file are to be translated.

"Legacy data structures" means one or more data structures (in the illustrated embodiment, of the type referred to below as a merged source-target database) generated by the translation memory system from legacy files.

"Leverage" means to use legacy data structures, if available, to generate corresponding target segments for translatable source segments.

"Local file system" means a group of files in one or more computer memory units that are part of the user computer or are directly connected to it without the use of an external network.

"Morphological" refers to the structure and formation of words.

"Morpho-syntactic" means morphological, syntactical, semantical, and/or grammatical.

"Project" means a group of files, including files in a source project and associated target project, upon which the translation memory system is to operate.

"Remote file system" means a group of files in one or more computer memory units that are connected to the user computer through an external network.

"Resource file" means a file in a conventional format for recording the content and attributes of display elements in a graphical windows user-interface environment.

"Segment" means any morpho-syntactically or otherwise identified group of characters. A segment may be a character, group of characters, word, group of words, clause, sentence, paragraph, page, section, chapter, document, file, or any other unit or grouping of characters. Typically, the syntactic rules by which a segment is identified are predefined with respect to each particular file type; that is, for each type of file having a particular file format, or syntax. For example, a segment in a resource file is identified by referring to predefined syntactic rules for resource files. Unless otherwise specified, the term "segment" as used herein refers collectively to a translatable source segment, a corresponding target segment, and/or a supporting source or target segment.

"Source file" means a file written in a source language.

"Source language" is the language that is being translated.

"Source project" means a group of one or more source files in a project.

"Source-target pair" means a translatable source segment and its corresponding target segment.

"Source segment" means a segment in a source file.

"Supporting source segment" means a source segment that is not to be translated from the source language to the target language. Rather, a supporting source segment provides information related to the presentation, or another attribute, of a corresponding target segment. For example, a source segment that specifies the font that is to be used to display a translatable segment would typically be a supporting source segment.

"Supporting target segment" means a target segment that is not a corresponding target segment, but provides information related to the presentation, or another attribute, of a corresponding target segment. For example, a segment that specifies the font that is to be used to display a corresponding target segment would typically be a supporting target segment.

"Target file" means a file corresponding to a source file, except that translatable source segments are replaced by corresponding target segments.

"Target language" is the language into which a segment is translated from the source language.

"Target project" means a group of one or more target files in a project.

"Target segment" means a segment in a target file.

"Translatable source segment" means a source segment that is to be translated from the source language to the target language.

"User computer" typically means a computer system (such as a personal computer, workstation, or network server, and associated devices), used by a user to implement the translation memory system. More generally, "user computer" refers to any type of computing platform, whether or not operated by a user.

"User-translator" means one or more people, one or more machines (such as a machine translation tool), or any combination thereof that (a) performs the translations from the source language to the target language and/or (b) uses the translation memory system.

In this detailed description, references are made to various functional modules of one embodiment of the present invention that may be implemented either in software, hardware, firmware, or any combination thereof. For convenience of illustration, references generally are made to implementations in software. Such references therefore typically refer to software-implemented functional modules that will be understood to comprise sets of software instructions that cause the described functions to be performed. Similarly, in a software implementation, translation memory system 100 as a whole may be referred to as "a set of translation memory instructions."

It will be understood by those skilled in the relevant art that, in such a software implementation, the functions ascribed to translation memory system 100, or any of its functional modules, typically are performed by the central processing unit (CPU) of the computer system executing such software instructions, typically in cooperation with an operating system executing on the computer system. More generally, it will be understood by those skilled in the relevant art that functions performed by the illustrated embodiment typically are performed by the CPU in cooperation with an operating system. Henceforth, the fact of such cooperation among the CPU, the operating system, and the modules of the illustrated embodiment, whether implemented in software, hardware, firmware, or any combination thereof, may therefore not be repeated or further described, but will be understood to be implied.

USER COMPUTER 110

FIG. 1 is a simplified functional block diagram of one exemplary embodiment of a computer environment including user computer 110, on which translation memory system 100 is implemented. User computer 110 may be a personal computer, network server, workstation, or other computer platform now or later developed. User computer 110 may also be a device specially designed and configured to support and execute the functions of translation memory system 100 as described below. User computer 110 includes known components including processor 105, operating system 120, memory 130, memory storage device 150, and input-output devices 160. It will be understood by those skilled in the relevant art that there are many possible configurations of the components of user computer 110 and that some components that may typically be included in user computer 110 are not shown, such as a video card, data backup unit, busses, cache memory, and many other devices.

Processor 105 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, a Power PC 603e RISC processor made by Motorola, or other processor now or later developed.

Processor 105 executes operating system 120, which may be, for example, one of the DOS, Windows 3.1, Windows for Work Groups, Windows 95, or Windows NT operating systems from the Microsoft Corporation; the System 7, System 8, or Macintosh System Software operating systems from Apple Computer; the Solaris operating system from Sun Microsystems; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. Operating system 120 interfaces with firmware and hardware in a well-known manner, and facilitates processor 105 in coordinating and executing the functions of the other components of user computer 110.

Memory 130 may be any of a variety of known memory storage devices or future memory devices, including, for example, any commonly available random access memory (RAM), magnetic medium such as a resident hard disk, or other memory storage device. Memory storage device 150 may be any of a variety of known or future devices, including a compact disk drive, a tape drive, a removable hard disk drive, or a diskette drive. Such types of memory storage device 150 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in memory 130, and/or the program storage device used in conjunction with memory storage device 150. Such computer software programs, when executed by processor 105 in cooperation with operating system 120, enable user computer 110 to perform the functions of the present invention as described herein. Accordingly, such computer software programs may be referred to as controllers of user computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. Such devices include, for example a keyboard, mouse, touch-screen display, touch pad, microphone with a voice recognition device, network interface card, or modem. Output devices of input-output devices 160 could include any of a variety of known devices for presenting information to a user, whether a human or a machine, whether local or remote. Such devices include, for example, a video monitor, printer, audio speaker with a voice synthesis device, network interface card, or modem. Input-output devices 160 could also include any of a variety of known removable storage devices, including a compact disk drive, a tape drive, a removable hard disk drive, or a diskette drive.

Translation memory system 100 could be implemented in the "C" programming language, although it will be understood by those skilled in the relevant art that many other programming languages could also be used. Also, as noted, translation memory system 100 may be implemented in any combination of software, hardware, or firmware. If implemented in software, translation memory system 100 may be loaded into memory storage device 150 through one of input-output devices 160.

USER-TRANSLATOR 170

In the illustrated embodiment, user-translator 170 is a person. User-translator 170 may be one person with translation skills. User-translator 170 may also be more than one person, such as a person with translation skills who creates target language translations in accordance with the invention, and another person who uses translation memory system 100 to dynamically align and propagate such target language translations in accordance with the invention. In alternative embodiments, the creation of target language translations may be accomplished not by a human being, but by a machine translation tool, or by such a tool in cooperation with a person.

REMOTE FILE SYSTEMS 180

Figure 2A:
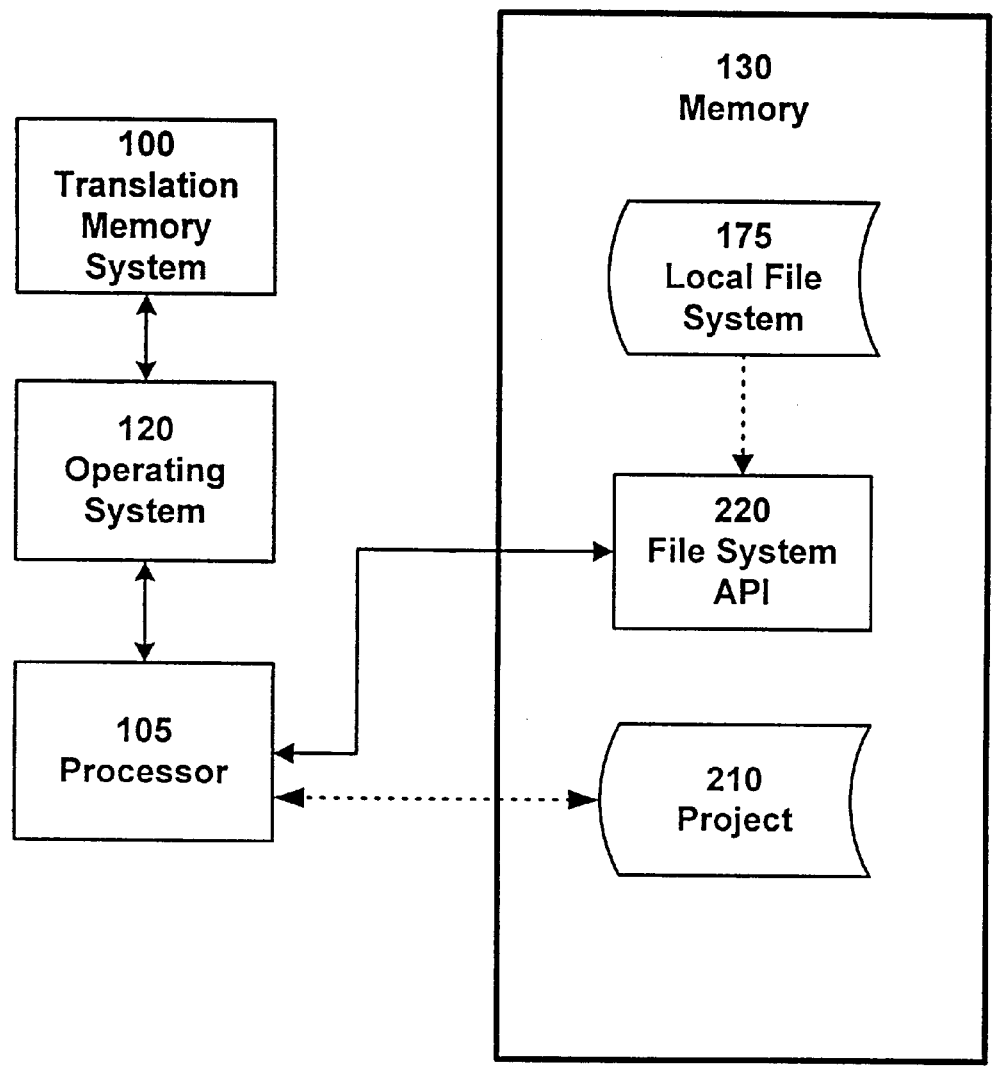
FIG. 2A is a simplified schematic block diagram including a local file system upon which the translation memory system of FIG. 1 operates in one embodiment.

FIG. 2A is a schematic block diagram illustrating a local file system upon which translation memory system 100 operates in the illustrated embodiment. File system 175 is referred to herein as a local file system because it is located within memory 130 of user computer 110. Also typically stored in memory 130 in the illustrated embodiment is one of a variety of known computer programs known as application program interfaces (API's). File system API 220 is one such known program that provides an interface in a known manner between translation memory system 100 and file system 175 via processor 105 and operating system 120. Also typically stored in memory 130 is project 210 that, in the illustrated embodiment, includes a source project and an associated target project, described below in relation to FIGS. 3 and 4.

Figure 2B:
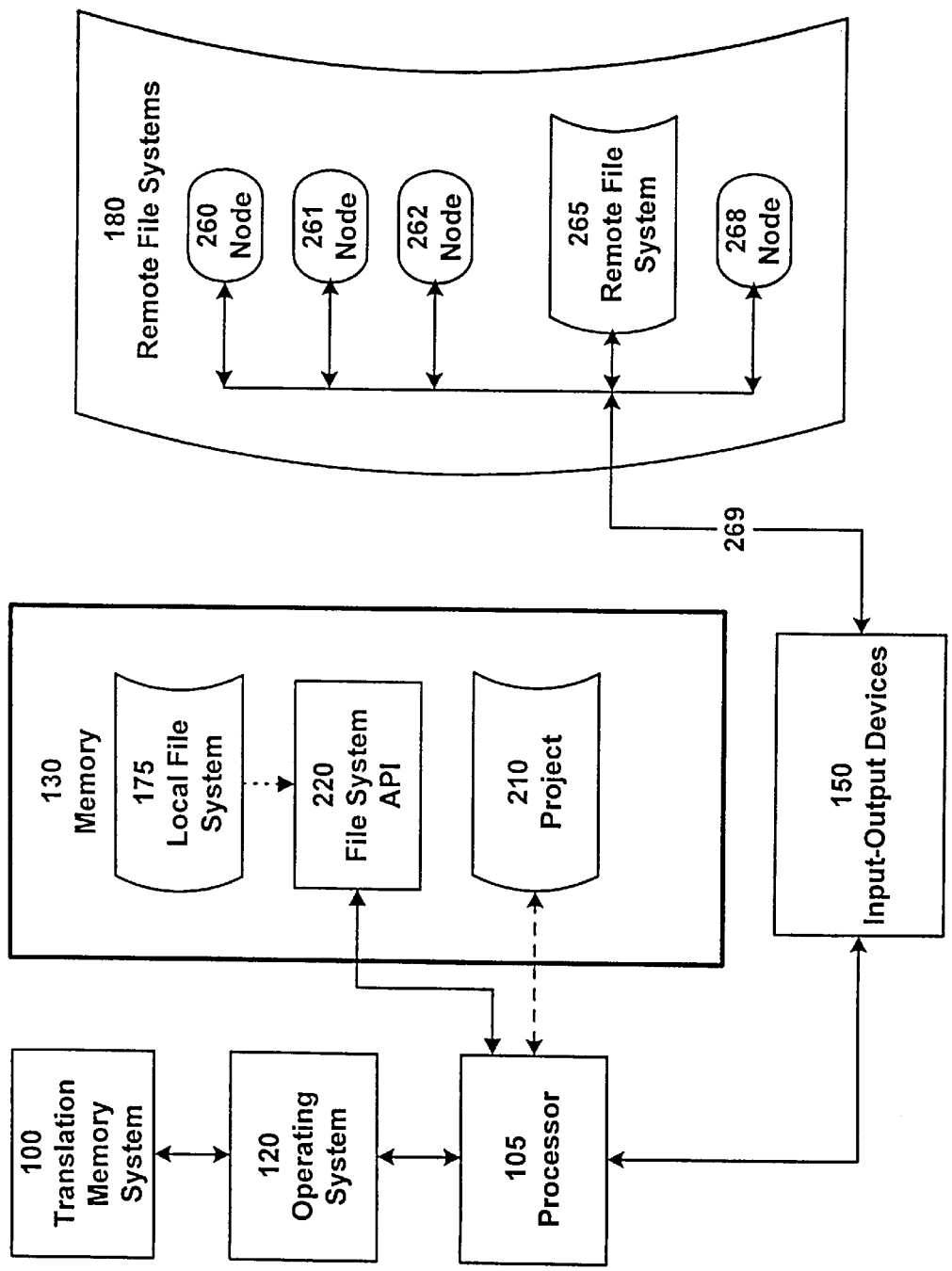
FIG. 2B is a simplified schematic diagram including a remote file system and a local file system upon which the translation memory system of FIG. 1 operates in an alternative embodiment.

An alternative implementation of the present embodiment is represented in FIG. 2B, in which translation memory system 100 operates on remote file system 265, or local file system 175, or both. In a known manner, translation memory system 100, via processor 105 and operating system 120, accesses files in remote file system 265 through input-output devices 150 and network 269. Input-output devices 150 typically includes a network card, modem, or similar devices. Network 269 typically includes network servers, switches, and other devices (not shown), and typically is connected to many nodes, such as nodes 260, 261, 262, and 268. Any such node may include personal computers, workstations, network servers, and other computer platforms. Any such node may also be another network. A remote file system may be located in, or distributed throughout, any such node or group of nodes. Although translation memory system 100 will hereafter be described in reference to the local file system 175 of FIG. 2A, it will be understood that the present invention in alternative implementations also operates upon remote file systems such as remote file system 265 of FIG. 2B.

TRANSLATION MEMORY SYSTEM 100

Figure 3:
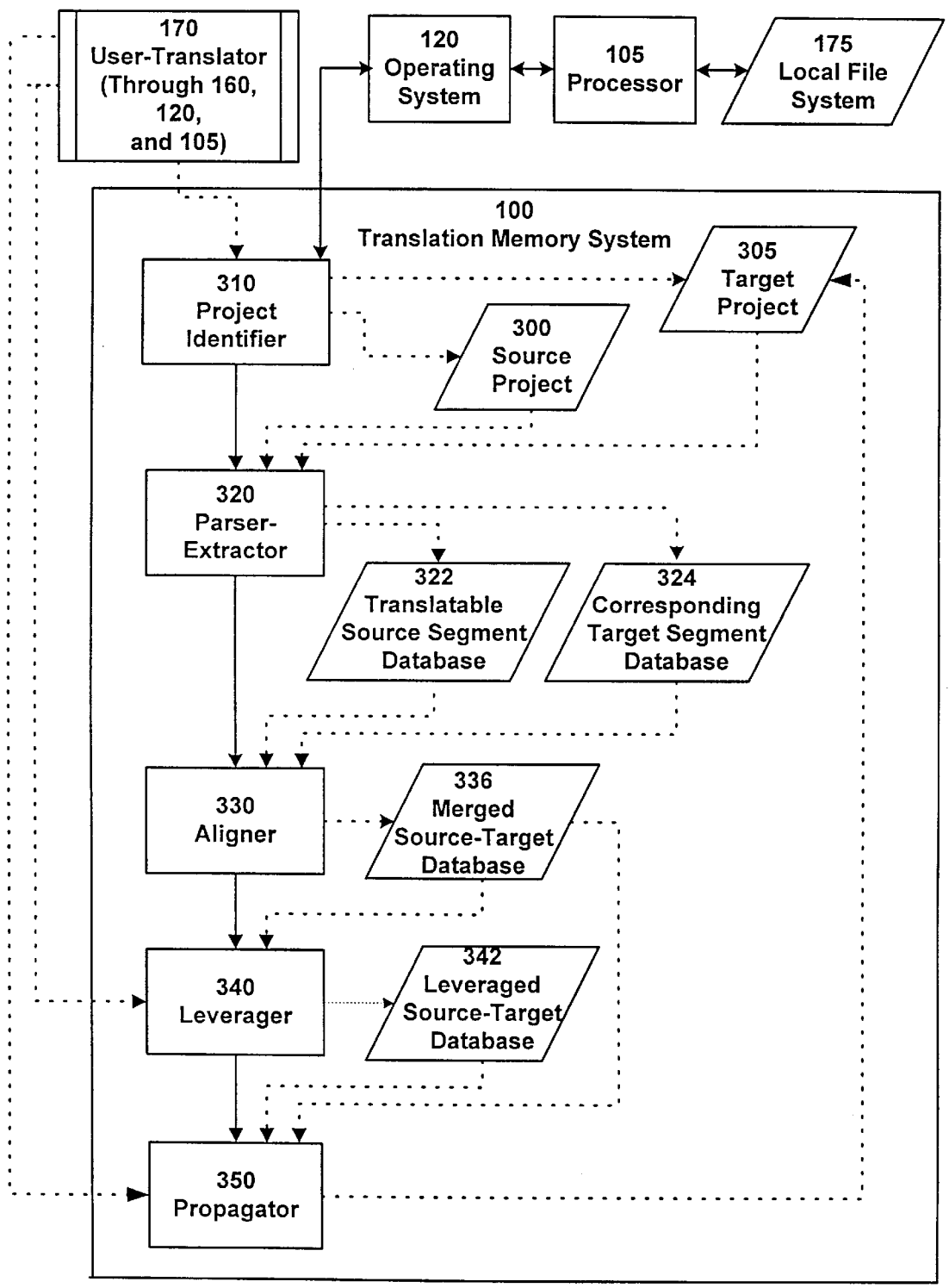
FIG. 3 is a functional block diagram of one embodiment of a translation memory system suitable for implementation in the computer system environment of FIG. 1.

As noted, translation memory system 100 dynamically propagates translations of translatable source segments to all associated corresponding target segments in a project. FIG. 3 is a functional block diagram of one embodiment of translation memory system 100 that includes project identifier 310, parser-extractor 320, aligner 330, leverager 340, and propagator 350.

Project identifier 310 selects files from local file system 175 to be included in source project 300 and target project 305 of project 210. Also, project identifier 310 identifies legacy files, if any, that are associated with any of the source files in source project 300.

Parser-extractor 320 processes each file in project 210, and associated legacy files, if any, to identify source segments and target segments. Parser-extractor 320 also customizes syntactical descriptions of file types of files included in project 210 or legacy files. Such customization is accomplished by tagging syntactical elements that may be useful in uniquely identifying source and target segments. Further, parser-extractor 320 determines identifying attributes of each translatable source segment and target segment and assigns a unique attribute identifier to each such segment, if such a unique attribute identifier may be determined.

Aligner 330 aligns source segments with corresponding target segments by correlating the unique attribute identifier of each source segment with a matching unique attribute identifier of a target segment to create source-target pairs. Aligner 330 stores such source-target pairs, and related information, into an appropriate data structure such as merged source-target database 336.

Leverager 340 leverages translations of translatable source segments provided by the parsing-extracting and aligning of legacy files. That is, leverager 340 uses legacy data structures generated by aligner 330, after parsing and extracting by parser-extractor 320, to generate corresponding target segments for translatable source segments having related translatable source segments in the legacy files. In particular, leverager 340 operates upon the data structure into which aligner 330 has stored source-target pairs of the legacy files. Leverager 340 determines if a translatable source segment in a source-target pair of a merged source-target data structure of the project matches a translatable source segment in the corresponding merged source-target data structure generated with respect to the legacy files. If so, then leverager 340 copies the corresponding target segment of such matching translatable source segment of the legacy files into the corresponding target segment of the matched translatable source segment of the merged source-target data structure of the project.

Propagator 350 associates all source-target pairs having the same translatable source segment. As will be described in detail below, such association enables a translation of such common translatable source segments to be propagated to the corresponding target segments corresponding to each such common translatable source segment in the project.

Project Identifier 310

Figure 4A:
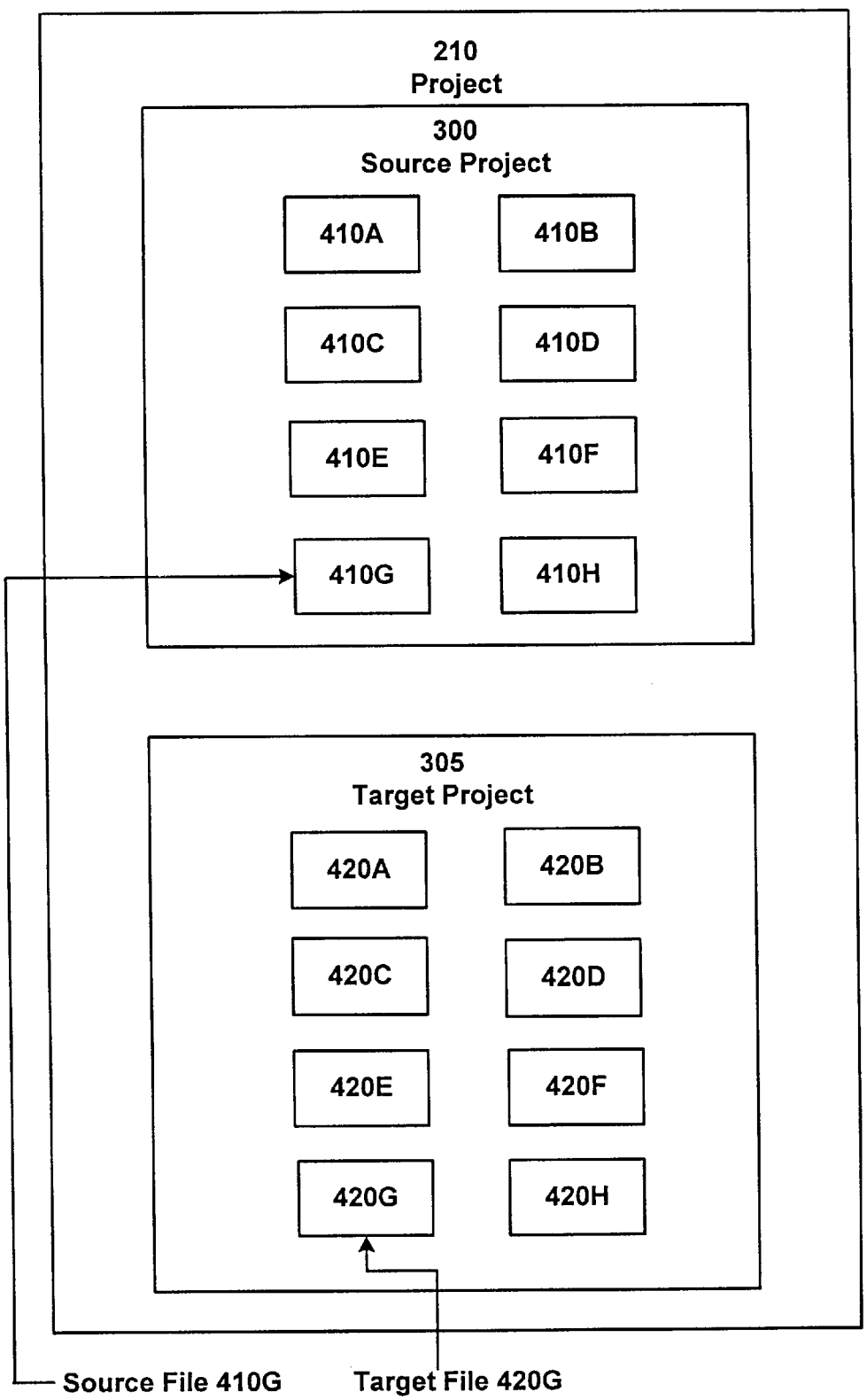
FIG. 4A is an illustrative schematic diagram of one embodiment of a project, including a source project having source files and a target project having corresponding target files, to be operated upon by the translation memory system of FIG. 3.
Figure 4B:
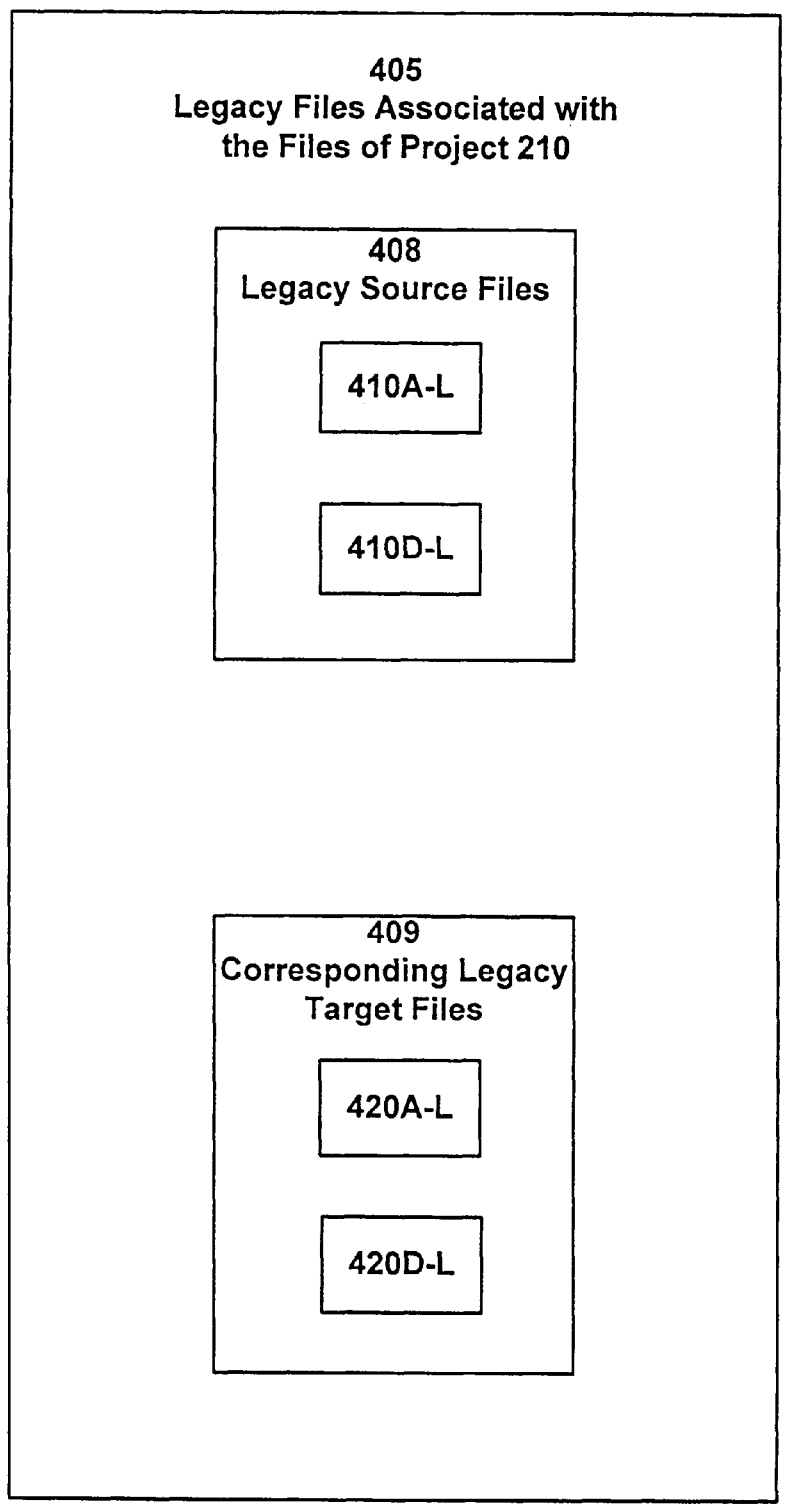
FIG. 4B is an illustrative schematic diagram of one embodiment of legacy files associated with a portion of the source files of the project of FIG. 4A.

As noted, project identifier 310 selects files from local file system 175 to be included in source project 300 and target project 305 of project 210. Project identifier 310 also selects legacy files, if any, associated with one or more of the files of project 210. Such legacy files are processed by parser-extractor 320 and aligner 330, and data structures generated by such pre-processing are used by leverager 340 as described below. FIG. 4A is an illustrative schematic diagram of project 210 including source files 410A-H of source project 300, and illustrative target files 420A-H of target project 305. FIG. 4B is a schematic diagram of available legacy files associated with the files of project 210.

The selection of files to be included in project 210: Project identifier 310 selects files in a known manner from local file system 175 (or, as noted, from remote file system 265 in other embodiments) to be included in source project 300. Typically, such selection is accomplished under the direction of user-translator 170; however, such selection may also be based on a default setting or predetermined criteria. For example, all resource files in memory 130, or files with a particular extension, may be selected unless user-translator 170 otherwise specifies.

The selection of legacy files associated with the source files of source project 300 of project 210: In accordance with any of a variety of known techniques, project identifier 310 also determines whether any legacy source files are available. As noted, translatable source segments of a legacy source file have been translated and stored in a corresponding target segment of a legacy target file). The translatable source segments are morphologically equivalent to associated translatable source segments in a project source file. For example, a project source file may be revised version (version 2.0 for illustration) of a resource file in English to be translated into French, and the associated legacy source file may be an initial version (version 1.0) of the same resource file from which version 2.0 was generated. Thus, the legacy source file (version 1.0) and the project source file (version 2.0) are referred to herein as being "associated." As another, non-limiting, example, the project source file may be twice-revised version 3.0, and the legacy source file may be version 2.0, from which version 3.0 was derived. Typically, legacy source file version 2.0 includes legacy information derived from legacy source and target files version 1.0. If not, the leveraging functions described below with respect to project identifier 310, parser-extractor 320, aligner 330, and leverager 340 may be applied first to provide legacy information from version 1.0 to version 2.0, and then repeated to provide legacy information from version 2.0 (now including the legacy information from version 1.0) to version 3.0. It will be understood that such multiple processing of legacy versions may be undertaken for as many iterations as desired, and such multiple processing therefore will not be repeatedly described.

Known techniques for identifying available legacy files may be employed, including, for example, using a graphical user interface to inquire of user-translator 170 whether legacy files are available and, if so, their location in local file system 175 (or remote file system 265). Another known technique is to search a look-up table (not shown) in memory 130 that correlates legacy source files with project source files in project 210. Such look-up table may be generated in accordance with any known or to-be-developed technique, such as providing a graphical user-interface to user-translator 170, or comparing file names and/or extensions.

As described below with respect to leverager 340, if such legacy files are available, but have already been operated upon by translation memory system 100, then legacy data structures typically are also available. Project identifier 310 determines whether such legacy data structures are available in accordance with any of a variety of known techniques, such as by searching a look-up table (not shown) in memory 130, or comparing file names and/or extensions. If legacy data structures are available, it generally is not required to again pre-process such legacy files to re-generate such legacy data structures. Rather, leverager 340 uses the information in the existing legacy data structures. Thus, project identifier 310 typically does not identify the already-processed legacy files for pre-processing by parser-extractor 320 and aligner 330.

For illustrative purposes, it is assumed that project identifier 310 identifies non-processed legacy source files that are associated with source files 410A and 410D of project 210. Such illustrative source legacy files 408 are shown in FIG. 4B. Also shown in FIG. 4B are corresponding legacy target files. For illustrative purposes, it is assumed that legacy source file 410A-L is associated with project source file 410A, and that their respective corresponding target files are 420A-L and 420A. It is similarly assumed that legacy source file 410D-L is associated with project source file 410D, and that their respective corresponding target files are 420D-L and 420D. For example, legacy source file 410A-L may be version 1.0 of a resource file for a particular graphical user interface. Legacy target file 420A-L may be a file containing corresponding target segments that are translations into French of English translatable source segments of legacy source file 410A-L. Project source file 410A may be a revised resource file, version 2.0, for a revised version of such graphical user interface that is to be translated from English into French. Similarly, legacy source file 410D-L may be an English-language version 1.0 of a document file used by a word processor software application, and corresponding legacy target file 420D-L may be a translation into French of file 410D-L.

Legacy files 405 are pre-processed by parser-extractor 320 and aligner 330 in the same manner as processing is carried out by parser-extractor 320 and aligner 330 on the source and target files of project 210. Because such operations are described in detail below with respect to project 210, they are not described with respect to the illustrative legacy files. Rather, it is noted that the pre-processing of legacy files 405 results in a legacy data structure that, in the illustrated embodiment, has the structure of merged source-target database 336. Such legacy data structure (not shown) is referred to for convenience as merged legacy source-target database 336-L, and its function is described below with respect to the operations of leverager 340.

Parser-Extractor 320

The operations of parser-extractor 320 are now described with respect to project 210 of FIG. 4A. As noted, such operations typically are also carried out, but are not separately described, with respect to associated legacy files 405 of FIG. 4B.

Figure 5:
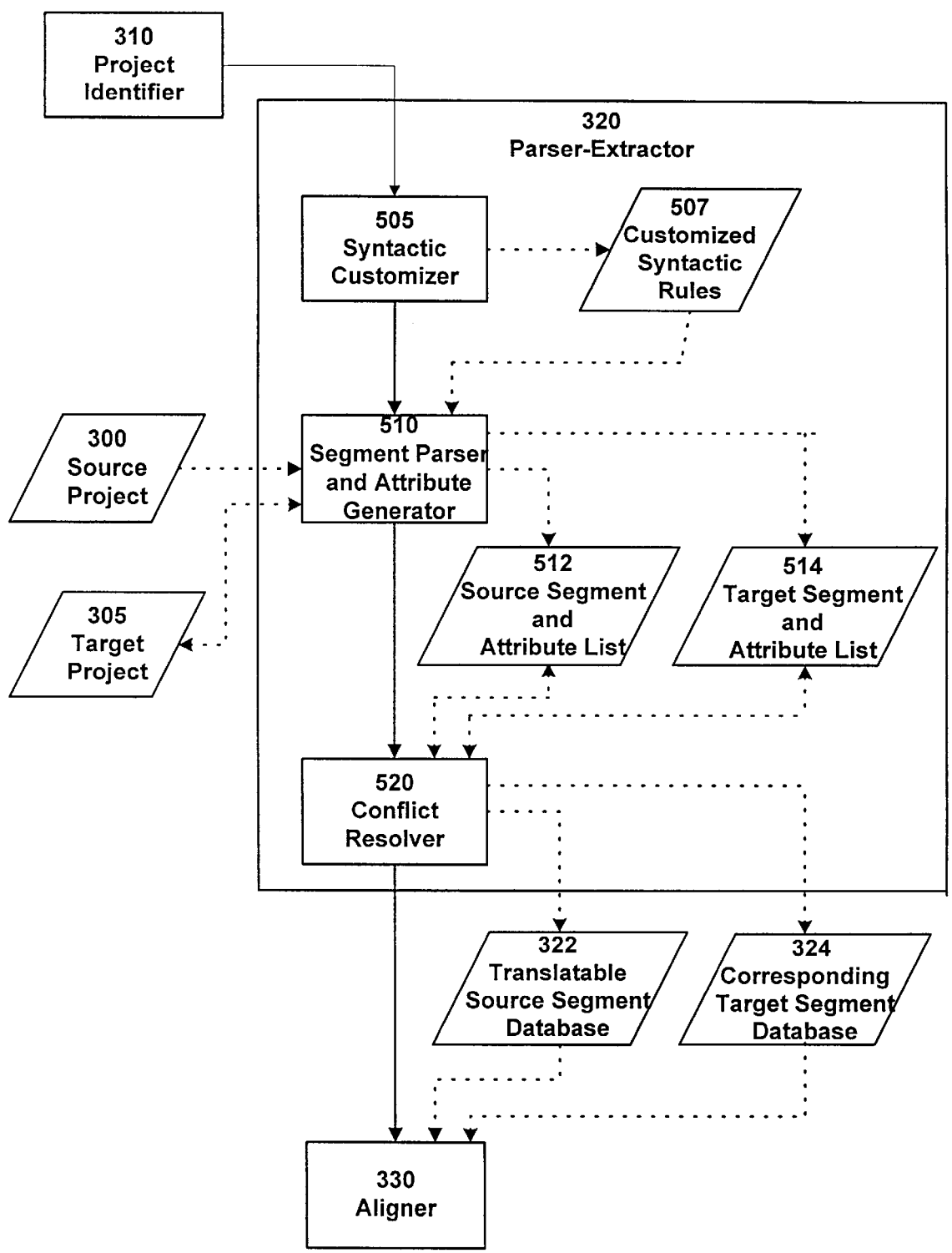
FIG. 5 is a functional block diagram of one embodiment of a parser-extractor of the translation memory system of FIG. 3.

FIG. 5 is a functional block diagram of parser-extractor 320. As shown in FIG. 5, parser-extractor 320 includes syntactic customizer 505 that generates customized syntactic rules 507 for identifying segments in a source or target file. Parser-extractor 320 also includes segment parser and attribute generator 510 that operates both on source files of source project 300 and on target files of target project 305. With respect to source files, segment parser and attribute generator 510 (hereafter, simply "parser 510") parses translatable and supporting source segments, extracts them, and stores them in an appropriate data structure, such as source segment and attribute list 512 (shown illustratively in FIG. 6B). With respect to target files, parser 510 identifies a pre-existing target file corresponding to each source file, or generates one if one does not already exist. Parser 510 then parses and extracts corresponding and supporting target segments from each of the target files and stores such target segments in an appropriate data structure, such as target segment and attribute list 514 (shown illustratively in FIG. 6C).

Parser-extractor 320 also includes conflict resolver 520 that determines whether the attribute identifier of each translatable source segment and each corresponding target segment is unique and, if not, assigns a unique attribute identifier. Such unique attribute identifiers, associated translatable source segments and corresponding target segments, supporting source and target segments, and information regarding the source and target files from which such segments were derived, are stored by conflict resolver 520 in appropriate data structures, such as translatable source segment database 322 and corresponding target segment database 324, respectively.

Syntactic customizer 505. Syntactic customizer 505 customizes rules specifying the syntax of files in source project 300 and target project 305. In particular, customizer 505 associates tags with selected syntactic rules in order to identify syntactic elements to be operated upon by segment parser and attribute generator 510. It will be assumed for illustrative purposes that such rules to be customized are provided in a BNF form, described in greater detail below with respect to the operation of segment parser and attribute generator 510. In the illustrated embodiment, the tags are provided in the form of extensions to conventional BNF notations. For example, the extension ".attr" applied to the conventional BNF notation "type" identifies a supporting source or target segment that is an attribute (e.g., the segment "button," or "message"). Similarly, the extension "attr." applied to the conventional BNF notation "id" identifies a supporting source or target segment that specifies a particular one of a group of possible "type" attributes (e.g., button #2, or message #19). Also, the extension ".store" applied to the conventional BNF notation "text" identifies a translatable source segment or a corresponding target segment, i.e., text that is to be translated, or is a translation, respectively.

Customizer 505 provides such tags in one implementation of the illustrated embodiment by comparing a highlighted exemplar of a file of a particular type to the syntactical rules in BNF form for that file type. For example, an exemplar may include the translatable source segment "Paste Special" in a resource file, and customizer 505 may highlight such segment by comparing it to a list of known translatable source segments for resource files in an appropriate look-up table (not shown). By comparing the syntactical content of the highlighted "Paste Special" in the exemplar to the syntactic rules specified in the BNF form, customizer 505 determines that "Paste Special" in the exemplar corresponds to the BNF notation "text." Thus, the tag ".store" is appended by customizer 505 to the notation "text" to indicate that any segment syntactically conforming to the rule governing the syntax of "text.store" is a translatable source segment or a corresponding target segment.

In an alternative embodiment, a group of exemplars for a particular file type may be compared to determine which productions syntactically describe file elements that have the greatest variance from other file elements that also are syntactically described by the same productions of that file type. Those productions corresponding with the greatest variance are customized because they are more likely to be useful in distinguishing among syntactic elements to be operated upon by parser 510. For example, three exemplary resource files, each having the rule "item" and its production "type id text," are compared to determine if there is a variance in the elements of any of such files, or group of such files, that are syntactically described by such rule and production. Because the file elements syntactically described by "type," "id," and "text" typically vary substantially within and among the exemplary files, they are customized to be "type.attr," "id.attr," and "text.attr." Any of a variety of known techniques may be employed to determine variance and to determine whether a variance threshold has been reached.

In yet further alternative embodiments, customizer 505 may be a human being. That is, a person may customize, for example, a look-up table including, or pointing to, syntactical rules in BNF form for a variety of file types. In both the illustrated embodiment and such alternative embodiments, the un-customized BNF rules (not shown) are externally provided in the form of a look-up table or in accordance with any of a variety of other known techniques.

Generally, customizer 505 customizes the syntactic rules applicable to a source or target file of a particular file type only the first time that such file type is encountered. That is, if a first source file of the resource-file type is customized by customizer 505, customizer 505 preferably does not repeat the customizing operation for a second source file (or a first target file) of the same resource-file type. The reason is that the customized rules applicable to one file of a particular file type typically are applicable to all other files of the same file type.

Although the BNF notation and the described extensions are used illustratively herein, it should be understood that customizer 505 may customize any notation, now known or to be developed in the future for describing syntactic rules;

may operate upon any rule or rule element of such notation; and may employ any of numerous types of tags in addition to the illustrative extension-type tag. Any of such customized syntactic rules provided by customizer 505 are generally and collectively represented in FIG. 5 as customized syntactic rules 507.

Segment parser and attribute generator 510. As noted, parser 510 processes each source file in source project 300 and target file in target project 305 to parse, extract, and store source and target segments, respectively, and to identify attribute information. Parser 510 processes supporting source segments as well as translatable source segments. Supporting source segments typically contain information that is related to a translatable source segment and may be used, for example, to determine how to display the translatable source segment. The supporting source segment itself, however, is not displayed or presented to a user. For example, a supporting source segment may include information, such as the segment "bold," regarding a font or effect to be used in displaying or presenting the translatable source segment. The segment "bold" is not itself displayed or presented.

Advantageously, supporting source segments are parsed, extracted, and stored by parser 510 in list 512 so that the information they contain may be associated with the target segment corresponding to the source segment. Thus, for example, information in a supporting source segment indicating that the translatable source segment "yes" is displayed in bold is preserved so that the corresponding target segment "oui" may also be displayed in bold with respect to a particular occurrence of such translatable source segment.

In the same manner, parser 510 processes supporting target segments and stores them in list 514. In particular, parser 510 processes supporting target segments and corresponding target segments in the manner described above with respect to supporting source segments and translatable source segments. Parser 510 also stores in lists 512 and 514 additional information regarding translatable source segments and corresponding target segments, respectively, such as their size and location in the source file or target file, respectively. Such information is described below with respect to the operations of aligner 330.

The characters in source or target files may be in any character format, such as ASCII, UNICODE 2.0, or other format now known or to be developed in the future. Generally, all languages may be expressed in a known or to-be-developed character format, including those using non-Roman characters (Asian languages and Cyrillic languages, for example), those using extended character formatting (Asian double-byte characters), and right-to-left languages (such as Hebrew and Arabic). Using known techniques, such as consulting a file-type look-up table (not shown), parser 510 identifies the type of each source and target file that is processed.

Typically, identification of the file type also provides identification of the character format employed in the file. For example, it may be specified in the file-type look-up table that a file of type "A" uses ASCII characters, and that a file of type "B" uses UNICODE 2.0 characters. However, if identification of existing, or to-be-developed, file types does not provide identification of the character format, such format is determined by any known or to-be-developed technique, such as using a character-type look-up table (not shown). Thus, employing any of a variety of known techniques for parsing and extracting character strings, parser 510 processes source and target files irrespective of the language in which they are written.

The operations of parser 510 are further described in reference to FIG. 6A that illustratively shows the syntax of a portion of source file 410A (see FIG. 4A) of source project 300. It is assumed for illustrative purposes that the syntax of source file 410A is expressed in a BNF form that is customized by customizer 505. It will be understood that reference to the BNF form is for illustrative purposes only, and that other known, or to-be-developed, forms or grammars for describing the syntax of files may be used in alternative embodiments. As noted above with respect to customizer 505, such syntactic information regarding a source file 410 is obtained by parser 510 in accordance with any of a variety of known techniques, such as consulting a BNF look-up table (not shown) containing customized BNF-form syntactical rules for various types of files.

The possibility that conflict resolver 520 will be able to uniquely identify a source or target segment, using attribute, syntactical, and other information relating thereto, generally is increased in proportion to the amount of syntactical information that is available with respect to the files from which the source or target segments are parsed. Parser 510 is not limited, however, to operating upon source or target files with respect to which a BNF, or other, form of expressing syntactical rules is known. In particular, in alternative embodiments, parser 510 may employ morpho-syntactic analysis to identify source and target segments.

A syntactical description in BNF form typically includes what are referred to herein as rules. In the illustrative example of FIG. 6A, the rules include a "File" rule 612A, a "Dialog" rule 612B, a customized "Header" rule 612C, a customized "id.attr" rule 612D, a "Body" rule 612E, a customized "Item" rule 612F, and a customized "type.attr" rule 612G (generally and collectively referred to as rules 612). Associated with each such rule is what is commonly referred to as a production, as illustrated by productions 614A-G (generally and collectively referred to as productions 614). In FIG. 6A, it is assumed for illustrative purposes that exemplary source files 410A and 410H are the same type of file and thus the same customized BNF form describes the syntax of both files. Typically, as noted, target files 420A and 420H are the same file types as their respective source files and, thus, in this example, the syntax of such target files is also expressed by the same customized BNF form (i.e., rules and productions).

Parsing and Extracting Source Segments, and Generating Their Attribute Identifiers: As an example of the operation of the illustrated embodiment, it is assumed that source file 410A is a resource file, and that parser 510 therefore utilizes a customized BNF form specific to resource files with respect to parsing source file 410A (and its corresponding target file 420A). Such customized BNF form is a particular implementation of customized syntactic rules 507, shown in FIG. 5.

Referring to the illustrative example of FIG. 6A, rule 612A-1 and its production 614A-1 indicate that file 410A-1 includes a type of information, designated as "File" information, that is made up of one or more instances of a type of information designated as "Dialog" information. (Use of the open parenthesis, close parenthesis, and asterisk surrounding the word "Dialog" in production 614A-1 is a BNF notation for indicating "zero or more instances of." If the "+" symbol is used instead of the asterisk, the meaning is "one or more instances of.") Similarly, as indicated by rule 612B-1 and its production 614B-1, "Dialog" information is made up of a type of information designated as "Header Body" information. Rules 612C-1 through 612G-1, and their respective productions, have similar meanings. Use of a pair of single quote marks around a string of characters, such as 'begin' found in production 614E-1, is a BNF notation for indicating that the characters within the single quote marks are a literal. That is, for example, the type of information designated as "Body" in rule 612E-1 is made up of the exact character string "begin." As also indicated in production 614E-1, "Body" information is also made up of zero or more instances of the type of information designated as "Item," and by the literal "end." The notation used in production 614D-1 indicates that the rule "id.attr" is made up of one or more occurrences of the numerals 0 through 9, inclusive, in any combination. Similarly, the notation in the production 614G-1 indicates that the rule "type.attr" is made up of one or more occurrences of the characters "a" through "z," in any combination.

As noted, the illustrative BNF form for a resource file shown in FIG. 6A is customized by adding the extensions ".attr" and ".store" to preselected rules and productions. In particular, as indicated in rules 612D-1 and 612G-1, information of types designated as "id" and "type," respectively, is tagged by the extension ".attr" to indicate that such information includes attribute information. Similarly, as indicated in production 614F-1, information of types designated as "text" is flagged by the extension ".store" to indicate that such information is a translatable source segment or a corresponding target segment. Thus, associated with each translatable source segment and each corresponding target segment may be zero or more attributes identified by the extension ".attr."

By way of further illustration, it is assumed that source file 410A includes the translatable source segments "Delete" (arbitrarily labeled as segment 410A-1, signifying the first translatable source segment of source file 410A) and "Are you sure you want to delete?" (arbitrarily labeled as segment 410A-7 for the seventh translatable source segment). The translatable source segment "Delete" may typically be displayed, for example, on a button or menu item that may be selected by a user of the windows graphical user interface generated in connection with resource file 410A. The translatable source segment "Are you sure you want to delete?" may be displayed in a message box that is shown to the user in response to the selection of "Delete" and before a delete function is implemented by the software application controlled by the graphical user interface.

Translatable source segments "Delete" and "Are you sure you want to delete?" of the present illustrative example are associated with the "text.store" notation of productions 614F-1 and 614F-7, respectively. As shown in FIG. 6A, these productions include two additional notations: "type-.attr" and "id.attr." As noted, the extension ".store" indicates that characters syntactically identified by the rules related to the notation "text.store" are customized to be designated by parser 510 as a translatable source segment or corresponding target segment.

As also noted, the "type.attr" notations in productions 614F-1 and 614F-7 refer to a type of graphical display element, for example, a button or a message box. The extension ".attr" in this example indicates that characters syntactically identified by the rules related to the notation "type.attr" are customized to be designated by parser 510 as containing an attribute identifier for the translatable source segment syntactically identified with reference to the associated "text.store" notation. Similarly, the "id.attr" refers to a particular display element: for example, button number 2, or message number 19. The ".attr" extension indicates that characters syntactically identified by the rules related to the notation "id.attr" are customized to be designated by parser 510 as containing an attribute identifier for the translatable source segment syntactically identified with reference to the associated "text.store" notation.

Parser 510 generates a number to serve as the attribute identifier of the translatable source segment "Delete." In other embodiments, such identifier may consist of a string of characters, or other representation that is not a number. However, numbers generally are desirable because they are efficiently stored, readily combined according to techniques that preserve or enhance uniqueness, and quickly compared in a computer environment.

The numerical attribute identifier of the illustrative embodiment is generated by applying any hashing or similar technique to one or more of the identifying attributes of each translatable source segment, or any combination thereof. For example, a hash table may contain a list of possible types of display elements (such as a button or message box) and the possible number of such display elements (corresponding to button number 2 or message number 19). Each entry in such list typically has a unique number associated with it. For an implementation in which only information corresponding to "type.attr" and "id.attr" is used to create an attribute identifier, and assuming the example of the source segment "Delete," parser 510 combines, manipulates, or otherwise processes the unique numbers associated with the entries for "button" (for the display element) and "2" (for the number of such elements). One such process would be simply to concatenate the two hash numbers. In other aspects of such implementation, any other technique may be used for generating an attribute identifier for a translatable source segment based on other combinations or permutations of representations of identifying attributes of the translatable source segment.

Generally, the more information that is used to generate an attribute identifier, the more likely that it will be unique; i.e., not the same as the attribute identifier of any other translatable source word in the same source file. Thus, it typically is desirable to include a more extensive combination of hash representations than described with respect to the illustrative example above. For example, one such alternative implementation is to generate attribute identifiers based on a combination of hash representations of rule names, and a hash representation of rule names and those of their productions tagged with the ".attr" extension, if any. One such alternative implementation is a combination of: h(File); h(Dialog); h(Header)+h(id[1]); h(Body); h(Item)+h(type[button] +h(id[2]), where the notation h( ) symbolizes the application of a hash function to the name, id, or type, between parentheses. It is assumed, for illustrative purposes, that the preceding example pertains to the translatable source segment "Delete" that is related to the first Header (which is the literal 'dialog') and to button number 2.

FIG. 6B is a partial schematic diagram of list 512 showing entries for the illustrative examples of the translatable source segments "Delete" and "Are you sure you want to delete?". As shown, list 512 includes records having two fields, generally and collectively referred to as translatable source segments 650, and corresponding attribute identifier and supporting source segments 655. Thus, for example, the character string "Delete" is stored by parser 510 in translatable source segment 650-1, and the character string "Are you sure you want to delete?" is stored in translatable source segment 650-7. The corresponding attribute identifiers, the generation of which is described above, are entered into fields 655-1 and 655-7, respectively. In the illustrated embodiment, selected supporting source segments such as a file identifier, are also stored by parser 510 in fields 655 of the appropriate translatable source segments.

If the syntax of the source file is not described in a BNF, or other similar, form, parser 510 nonetheless performs the functions described above. That is, it identifies source segments, determines whether they are translatable source segments, determines identifying attributes of translatable source segments, generates attribute identifiers from the identifying attributes, and stores the translatable source segments and corresponding attribute identifiers and supporting source segments in source segment and attribute list 512. Such functions may be performed by identifying the file type of the source file, parsing and extracting segments from the source file in accordance with any of a variety of known techniques, and searching for segments that match file-type-specific lists of attribute-indicating or translatable-source-segment indicating segments (such as the segment "<KEY-Segment>" in a file of the HTML type).

Therefore, parser 510 may parse any known or future file type and store the parsed and extracted source segments into any appropriate data structure. Advantageously, the data thus stored may be operated upon by other elements of translation memory system 100 without regard to the types of files from which such data were derived. In particular, a single propagation technique, described below, may be used irrespective of the type of files processed by parser 510.

Parsing and Extracting Target Segments, and Generating Their Attribute Identifiers: In accordance with any of a variety of known techniques, parser 510 identifies a target file corresponding to each source file in source project 300, if such target files exist. For example, translation memory system 100 may create and store a source-target file correlation list (not shown) in memory 130 that is consulted by parser 510. Such correlation list may correlate locations of target files, created or operated upon by translation memory system 100, with locations of corresponding source files.

For example, parser 510 may prompt user-translator 170 to identify a target file to correlate with a source file in accordance with any of a variety of known techniques for identifying and associating files. For example, a graphical user interface may display a tree-like directory of source and target files so that user-translator 170 may select a particular target file and a particular source file and thus identify them as a source-target file pair. As noted, the identified source and/or target files generally may be located either in a local or remote file system, although in the present embodiment it is assumed that they are located in local file system 175 in memory 130. A target file typically is correlated with a source file because the target file is a previous translation of the source file or of a previous version of the source file.

In the illustrated embodiment, it is assumed that such technique, or another known technique, has been employed to correlate source files with corresponding target files. FIG. 4A shows illustrative examples of source files 410A-H in source project 300 and corresponding target files 420A-H in target project 305. For clarity, it is assumed that source files labeled with a particular letter correspond with target files labeled with the same letter; thus, it is assumed that source file 410A corresponds with target file 420A. Such correspondence may occur, for example, if target file 420A is a previous translation of source file 410A, or includes corresponding target segments copied by leverager 340 from legacy corresponding target segments.

If there is no target file corresponding to one or more of the source files of source project 300, parser 510 generates such corresponding target files by copying the source files. Thus, if there is no target file corresponding to source file 410B, parser 510 copies source file 410B to create target file 420B. In alternative embodiments, such a default version of target file 420B may be created in accordance with any known technique, such as copying the structure, but not the contents, of source file 410B into target file 420B, and leaving null or empty fields for the contents.

Source files 410A-H and target files 420A-H may include any type of file. For example, the source and target files may be resource files, Unix interface files, HTML files, or any other types of files now known or later to be developed, or any combination thereof, that contain translatable source segments that are to be translated into the target language. By way of further example, source files 410A-H or target files 420A-H may be those developed for any of a variety of applications, such as help files used in software applications or word-processing-document files, for example, those generated by Microsoft Word or WordPerfect®.

Typically, each pair of source and target files is of the same file type, although it need not be so in alternative embodiments. For example, in the illustrated embodiment, if source file 410E is a resource file, then target file 420E is also a resource file. Such compatibility provides that the information presented to a user in the target language will be processed and presented to the user in the same manner as is the corresponding information in the source language. Optionally, parser 510 verifies such compatibility for each pair of source and target files in accordance with any of a variety of known techniques for identifying file types. If an incompatibility exists, parser 510 may generate a new target file 420E by copying source file 410E, or take other action, such as translating from one file format to another, or alerting user-translator 170 to the apparent error. It is evident that such verification generally is not required if target file 420E was generated by copying source file 410E.

Parser 510 parses and extracts target segments in the same manner as described above with respect to the parsing and extracting of source segments. Parser 510 also identifies corresponding and supporting target segments in the same manner as described above with respect to translatable and supporting source segments. Furthermore, parser 510 generates attribute identifiers for corresponding target segments in the same manner as described above with respect to translatable source segments. Such information is stored in target segment and attribute list 514, an illustrative example of which is shown in FIG. 6C, in the same manner as described above with respect to the storage of information in source segment and attribute list 512.

It is assumed for illustrative purposes that file 420 has been copied from file 410 by parser 510 in the manner described above. Therefore, for example, the corresponding target segments 660 (such as 660-1 and 660-7) are the same as the translatable source segments (such as 650-1 and 650-7) from which they were copied. The illustrative structure of list 514 as shown in FIG. 6C is the same as that of list 512, as shown in FIG. 6B. However, it need not be so. Also, it will be understood by those skilled in the relevant art that lists 512 and 514 need not be separate data structures, and that the particular structure shown for lists 512 and 514 are illustrative only.

Conflict Resolver 520. Conflict resolver 520 provides that a unique attribute identifier is assigned to each translatable source segment and each corresponding target segment in lists 512 and 514, respectively. The term "unique" is used in this context to indicate that no two or more translatable source segments in a source file have the same attribute identifier, and that no two or more corresponding target segments in a target file have the same attribute identifier.

Conflict resolver 520 stores such unique attribute identifiers, and their associated translatable source segments or corresponding target segments, in appropriate data structures, such as databases 322 and 324 described below.

Figure 8:
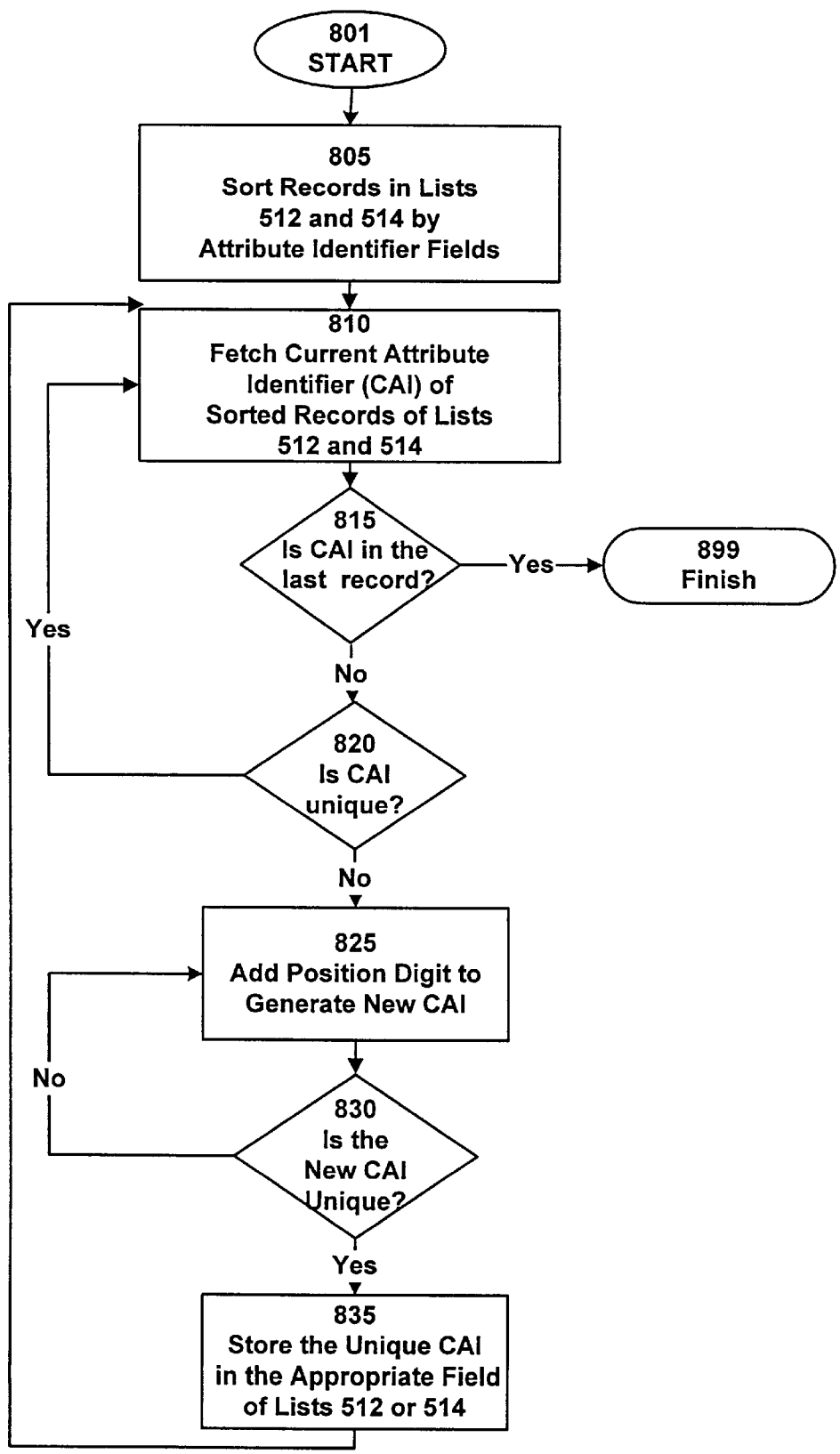
FIG. 8 is one embodiment of a flow diagram showing the steps by which the illustrative segment parser and attribute generator of the parser-extractor of FIG. 5 stores unique attribute identifiers into appropriate fields of the illustrative source segment and attribute list of FIG. 6B and the illustrative target segment and attribute list of FIG. 6C.

FIG. 8 is a simplified flow diagram showing the steps undertaken by one implementation of conflict resolver 520 to identify and store unique attribute identifiers. There are many alternatives or variations that may be used in other implementations of the present invention to perform such functions, and, thus, the flow diagram of FIG. 8 will be understood to be illustrative only.

Advantageously, conflict resolver 520 sorts the records in lists 512 and 514 based on the attribute identifier portion of fields 655. Such procedure is represented in FIG. 8 by procedure block 805. In the illustrated implementation, such sorting is done, in accordance with any of a variety of known techniques, such that the attribute identifiers are in ascending order. Such sorting need not be done in other embodiments, but is desirable because it typically increases the speed of search and compare, or similar, operations.

As noted, parser 510 typically processes a file from the beginning to the end so that the first segment identified (such as segment 410A-1) is the closest segment to the beginning of the file. As also noted, each occurrence of a translatable source segment, or of a corresponding target segment, typically is stored by parser 510 in lists 512 or 514, respectively, in the order in which such segment is processed; i.e., the order in which such segment appears in the file. Such order is referred to for clarity as "positional order." In the event that any two or more attribute identifiers in one or the other of list 512 and 514 are the same, conflict resolver 520 preserves such positional order. Thus, for example, if the record for segment 410A-2 (not shown) in list 512 contains in field 655 the same attribute identifier as is recorded in field 655-1 for segment 410A-1 (shown in FIG. 6B), then the record for segment 410A-2 will continue to follow the record for segment 410A-1 in list 512.

As shown by procedure block 810, conflict resolver 520 sequentially fetches from the lists 512 and 514 the sorted attribute identifiers. Such sequence in the illustrative embodiment of FIG. 8 begins with the first sorted attribute identifier in list 512, continues through the last sorted attribute identifier in list 512, and then repeats such sequence for the sorted attribute identifiers in list 514. Other implementations need not employ the same sequence, or conform to any sequential order. The sorted attribute identifier so fetched is hereafter referred to, for clarity, as the "current attribute identifier (CAI)."

For clarity, the further functions of conflict resolver 520 are now described in relation to its operations on source segment and attribute list 512. It will be understood that, after completing such operations, the analogous operations are conducted by conflict resolver 520 on target segment and attribute list 514. Decision block 815 represents the operation of determining whether the record from which the CAI was fetched is the last record in list 512. If so, then the operations of conflict resolver 520 are finished. If not, then, as represented by decision block 820, conflict resolver 520 determines whether the CAI is unique within list 512. Such determination is made in accordance with any of a variety of known techniques, such as search and compare techniques.

If the CAI is unique within list 512, conflict resolver 520 then fetches the next attribute identifier (as indicated by procedure block 810), which thus becomes the new CAI. If the CAI is not unique, conflict resolver 520 attempts to make it unique. In one embodiment, such function is undertaken by combining a representation of the positional order of the CAI with the existing value of the CAI. As represented by procedure block 825 and decision block 830, such function is implemented in the illustrated embodiment by incrementing such existing value by a number corresponding to the positional order of the CAI. That is, if the CAI is the first in a sequential group of three attribute identifiers of sorted list 512, the existing value (for example, 1000) is incremented by one (1001). If the CAI is the second in such group, then the value of the CAI will initially be the same as the value of the attribute identifier of the third of such group (1000), and thus decision block 830 will cause procedure block 825 to be repeated so that the new value of the CAI of the second of the group (1001) will equal the revised value of the attribute identifier of the first of the group. Therefore, procedure block 825 will again be repeated so that the value of the CAI of the second of the group is again incremented (1002). In such, or in accordance with any of a variety of other known techniques, the existing value is incremented by a value representing the positional order of the CAI.

If such combination of the initial CAI with such positional order value does not result in a unique CAI, additional procedures (not shown) may be employed. For example, the CAI may be continually incremented until a unique value is obtained. Also, in accordance with known graphical-user-interface, or other, techniques, conflict resolver 520 may inform user-translator 170 of such conflict between equal attribute identifiers in list 512 and obtain user-supplied values that may be employed to differentiate between or among the conflicting attribute identifiers.

Once a unique attribute identifier is determined, conflict resolver 520 stores the unique attribute identifier into the appropriate record in list 512. As indicated by block 810, conflict resolver 520 proceeds to fetch the next current attribute identifier from list 512. As noted, the preceding procedures are repeated for each record of list 512, and then the same procedures are applied to list 514. Consequently, after both lists 512 and 514 are so processed, conflict resolver 520 has retained or stored in lists 512 and 514 unique attribute identifiers for each translatable source segment and corresponding target segment, respectively.

Figures 7A, 7B:
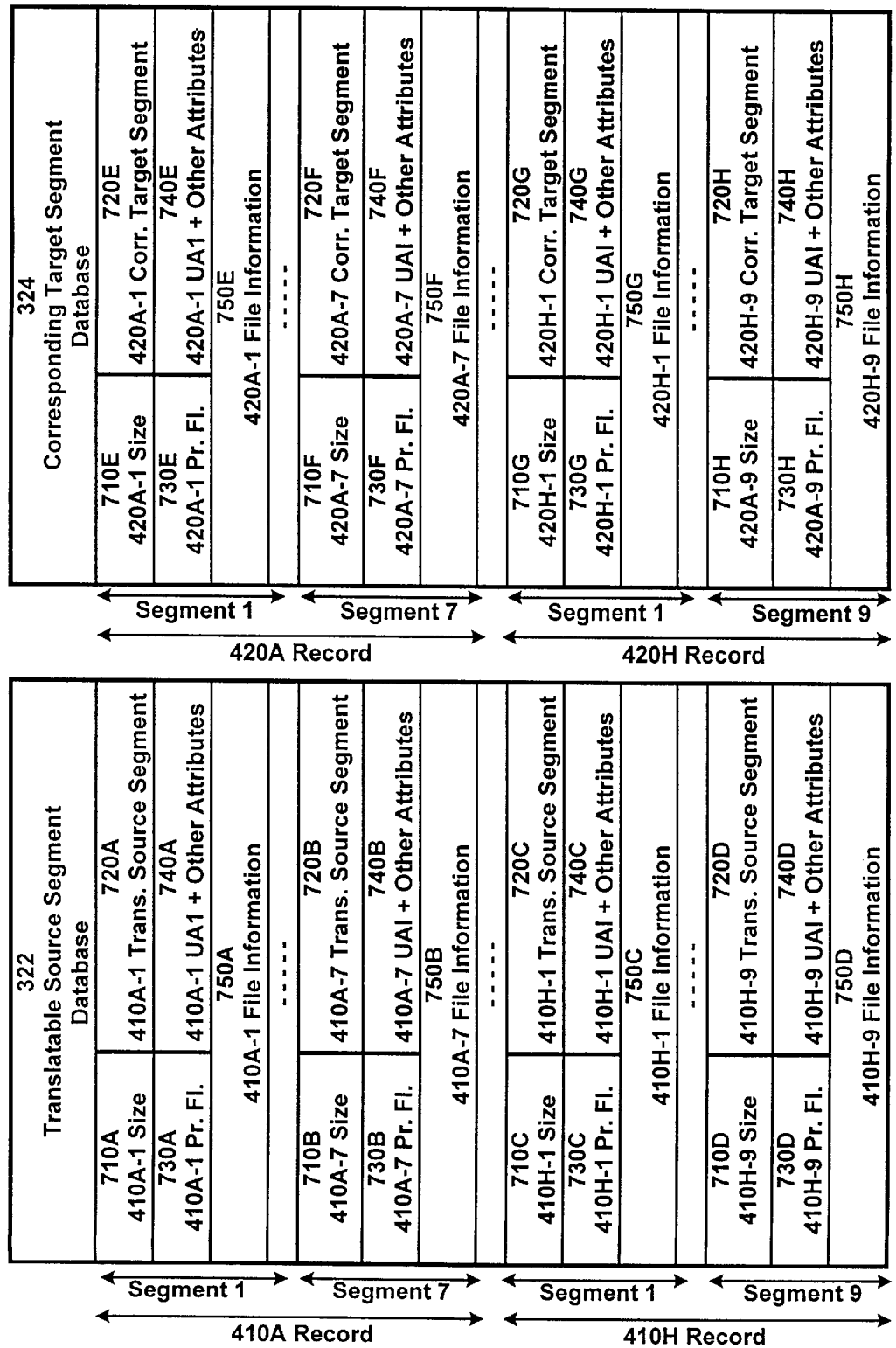
FIG. 7A is a partial schematic diagram of one illustrative embodiment of a translatable source segment database in which one embodiment of a conflict resolver of the parser-extractor of FIG. 5 may store translatable source segments and associated information derived from the source files of the illustrative source project of FIG. 4A.
FIG. 7B is a partial schematic diagram of one illustrative embodiment of a corresponding target segment database in which one embodiment of a conflict resolver of the parser-extractor of FIG. 5 may store corresponding target segments and associated information derived from the target files of the illustrative target project of FIG. 4A.

For clarity of illustration, conflict resolver 520 of the illustrated implementation creates appropriate data structures into which the information in lists 512 and 514 may be copied. It will be understood that such additional data structures typically are not required, and that lists 512 and 514, or another data structure, may be employed in other implementations for storing such information. FIGS. 7A and 7B are partial schematic diagrams of databases 322 and 324, respectively, which are illustrative examples of such additional data structures into which such information may be stored.

In databases 322 and 324, a record is created for each translatable source segment or corresponding target segment of the exemplary source and target files 410A and 420A, respectively. Each such record includes five fields that generally and collectively are referred to as: size and location fields 710, segment fields 720, propagation flag fields 730, unique attribute identifier and other attribute fields 740, and file information fields 750. Thus, for example, the size and locations fields for the records in databases 322 and 324 are arbitrarily labeled 710A through 710H, as shown in FIGS. 7A and 7B.

Conflict resolver 520 stores in size and location fields 710 a representation of the size, typically in the number of bytes, of the translatable source segment or corresponding target segment in fields 720 of the corresponding records. Also typically stored in fields 710 are offset lengths from the start of the corresponding source or target file to the translatable source segment or corresponding target segment, respectively, in order to specify the location of such segments in such files. Such location information enables the construction of a target file essentially identical to an associated source file with respect to its display attributes, except for translations from source to target language. In particular, such construction is enabled even if the lengths of corresponding target segments are different than the lengths of translatable source segment from which they were translated, as is typically the case.

Conflict resolver 520 stores in segment fields 720 of database 322 the translatable source segments of the source files of source project 300, and stores in segment fields 720 of database 324 the corresponding target segments of the target files of target project 305. Propagation flag (abbreviated as "Pr. Fl." in the figures) fields 730 are described below with respect to the operations of propagator 350.

Conflict resolver 520 stores in unique attribute identifier and other attribute ("UAI+Other Attributes") fields 740 the unique attribute identifier for the segments in fields 720 of corresponding records. Also stored in fields 740 are flags indicating whether various attributes of the translatable source segment or corresponding target segment are present; for example, initial capitals and other case permutations, font, special effects, other user-interface indicators, and other attributes.

File information fields 750 are used to store information regarding specific characteristics of the source or target files from which the translatable source segments and corresponding target segments, respectively, are derived. For example, fields 750 may be used to store file type, file-format type, file size, file location, character-format type, and so on. In the illustrated implementation, fields 750 are expandable; that is, if the space initially allotted is insufficient to store the information, a link is established to an additional storage area in memory 130. Any other of a variety of known techniques for storing information of variable length may be used in alternative implementations.

Advantageously the information stored in fields 710–750 enables translation memory system 100 to support any known, or to be developed, type of file, file format, or character format. Specifically, translation memory system 100 is thus enabled to build a target file that exactly replicates the source file from which it was derived, whatever its type or format, except for the translation of translatable source segments into corresponding target segments. In addition, as described below in greater detail with respect to merged source-target database 336, such information enables the generation of distributable files that enable the reconstruction of the original source files or translated target files without having access to such original files.

Aligner 330

The operations of aligner 330 are now described with respect to project 210 of FIG. 4A. As noted, such operations typically are also carried out, but are not separately described, with respect to associated legacy files 405 of FIG. 4B. Aligner 330 merges translatable source segments and their corresponding target segments, as well as associated information stored in databases 322 and 324, to create what is referred to herein as source-target pairs. Specifically, each such pair includes a translatable source segment and its associated information, and a corresponding target segment and its associated information. Aligner 330 stores such pairs in an appropriate data structure, such as merged source-target database 336 of the illustrated implementation.

Merged Source-Target Database 336: Merged source-target database 336 (hereafter, simply "merged database 336") is partially shown in FIG. 7C. It will be understood by those skilled in the art that merged database 336 is only one of many data structures that could be used. For purposes of speed and efficiency, however, the structure of the merged data base preferably is similar to the structures of the databases from which it is built. Thus, in the illustrated implementation, merged database 336 is similar in structure to databases 322 and 324.

As noted, a corresponding target file is created by parser 510 if one does not exist; e.g., there is no prior translation of a source file. In such cases, all or some of the records of database 324 may contain information relating to copies of the corresponding source segments. Such "copy-derived" target records thus do not contain a translation in the target language of the corresponding source segment. Aligner 330 nevertheless preferably aligns the copy-derived target records with their associated source records as a source-target pair. Thus, provision is made for the subsequent insertion of a translated corresponding target segment and its related information into merged database 336.

Referring to FIG. 7C, it is shown that there is a record in merged database 336 for each source-target pair, such as 410A-1 and 420A-1, or 410H-9 and 420H-9, of the illustrated example. Each record of a source-target pair includes, in the illustrated implementation, nine fields. Such fields are generally and collectively referred to as: translatable source segment size and location fields 760, translatable source segment fields 765, corresponding target segment size and location fields 770, corresponding target segment fields 775, propagation flag fields 780, matched unique attribute identifier and attribute fields 785, source file information fields 790, target file information fields 795, and pointer-to-page-of-occurrence-book fields 798.

Figure 9:
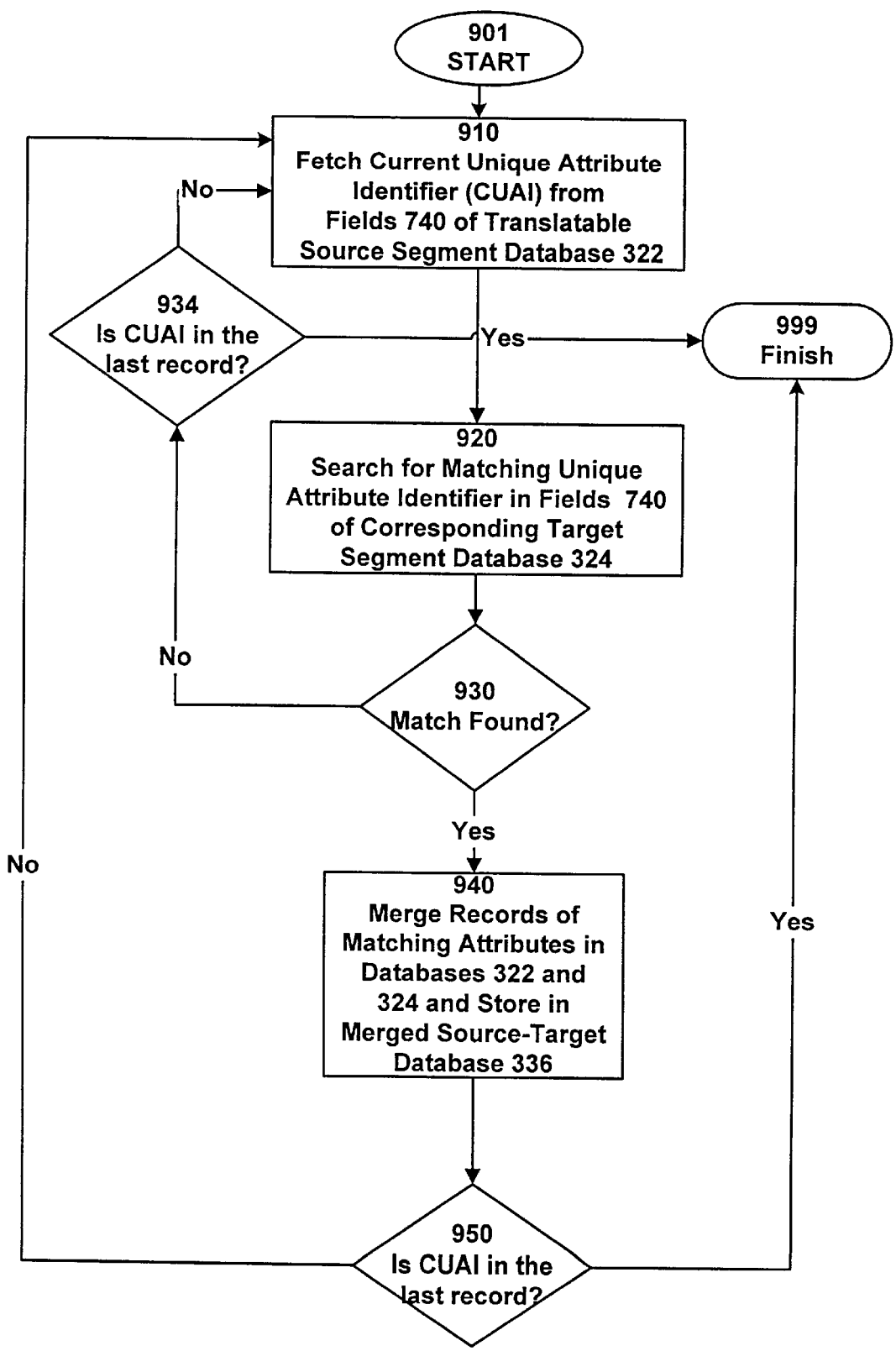
FIG. 9 is one embodiment of a flow diagram showing the steps by which one embodiment of the aligner of the translation memory system of FIG. 3 merges records of the translatable source segment database of FIG. 7A and the corresponding target segment database of FIG. 7B into the merged source-target database of FIG. 7C.

In order to insert information in such fields of each source-target pair record, aligner 330 of the illustrated embodiment aligns each translatable-source-segment record in database 322 with one corresponding-target-segment record in database 324. Such alignment is accomplished by matching unique attribute identifiers as stored in fields 740 of databases 322 and 324. FIG. 9 is a simplified flow diagram showing the steps undertaken by one implementation of aligner 330 to accomplish such alignment. There are many alternatives or variations that may be used in other implementations of the present invention to perform such function, and, thus, the flow diagram of FIG. 9 will be understood to be illustrative only.

As shown by procedure block 910, aligner 330 sequentially fetches unique attribute identifiers from fields 740 of translatable source segment database 332, starting with the first record in the database. Such unique attribute identifier currently being operated upon by aligner 330 is referred to as the "current unique attribute identifier (CUAI)." The record from which the CUAI is fetched is referred to as the "current source segment record."

Thus, in the illustrative example, aligner 330 begins by fetching the unique attribute identifier stored in field 740A, which thus becomes the CUAI. Aligner 330 searches fields 740 of corresponding target segment database 324 to find a match between the CUAI and a unique attribute identifier in one of such fields, as represented by procedure block 920. If a match is not found, aligner 330 fetches the next CUAI, if one exists. If a match is found, aligner 330 creates at block 940 a source-target pair record in merged database 336 including information from both the current source segment record of database 322 and the record of database 324 containing the matching unique attribute identifier. As shown by decision blocks 934 and 950, the operations of aligner 330 are finished if the CUAI is contained in the last record of database 322. Otherwise, aligner 330 fetches the next unique attribute identifier from database 322, which thus becomes the new CUAI.

Thus, aligner 330 finds matching source-target pairs and stores the information in the source-target pairs in a source-target-pair record of merged database 336. Specifically, in one illustrative example, the location and size information in field 710A of database 322 relating to translatable source segment 410A-1 is stored in field 760A of merged database 336. Translatable source segment 410A-1, as stored in field 720A of database 322, is stored in field 765A of merged database 336. The location and size information in field 710E of database 324 relating to corresponding target segment 420A-1 is stored in field 770A of merged database 336. Corresponding target segment 420A-1, as stored in field 720E of database 324, is stored in field 775A of merged database 336. The unique attribute identifier that is common to both translatable source segment 410A-1 and corresponding target segment 420A-1 (because they were found to match by aligner 330, as found in either field 740A of database 322 or field 740E of database 324), is stored in attribute field 785A of merged database 336. Also stored in field 785A is other attribute information stored in either field 740A or 740E. Similarly, source file information respectively found in fields 750A and 750E of databases 322 and 324, is stored in fields 790A and 795A of merged database 336, respectively. Typically, referring generally and collectively to the indicated fields in each source-target-pair record, fields 765, 775, 785, 790, 795, and 798 (described below) may be varied in length in accordance with any of a variety of known methods.

Two additional fields of the record for source-target pair 410A-1 and 420A-1 in merged database 336 are of particular relevance to the functions of propagator 350, as described below. Specifically, propagation flag fields 780 (abbreviated "Pr. Fl." in FIG. 7C) indicate whether the corresponding target segment stored in that record, i.e., the segment stored in field 775A in this illustrative example, should be propagated to all occurrences of the associated translatable source segment that is stored in field 765A. As is described below, the setting of propagation flags 780 enable user-translator 170 to determine whether or not an entry is to be translated in the same manner as are all other entries having the same translatable source segment. Typically, aligner 330 sets each such flag to an initial default state indicating that the corresponding target segment should be so propagated. The second of the particularly relevant fields is pointer-to-page-of-occurrence-book fields 798. Pointer fields 798 contain pointers to pages in pair-occurrence pointer book 1022, described below. It will be understood by those skilled in the relevant art that a pointer may be implemented in accordance with any of a variety of known techniques, such as providing an absolute or relative address, a hash table representation, or any other representation thereof.

Advantageously, in an alternative embodiment, the information in merged database 336 may be stored on a removable one of memory storage devices 150, such as a floppy disk, or transmitted over one of input-output devices 160, such as a modem connected to a transmission channel or network. Without access to the original files, a user receiving such information at a local or a remote location (hereafter, for clarity, simply a "remote user" at a "remote location") may then operate upon such information. For example, the remote user may convert the content and display information included in merged database 336 to any of a variety of known, or to-be-developed, display formats. Thus, the source and target files from which merged database 336 is derived may be reconstructed and displayed on a display device at the remote location. Such reconstruction and display may be implemented, for example, by a software program (not shown) written with knowledge of the structure and meaning of the contents of databases 322 and 324, and executed by an appropriate computer system at the remote location (the "remote computer").

Also, in such alternative embodiment, the remote user may employ leverager 340 and/or propagator 350 without employing project identifier 310, parser-extractor 320, or aligner 330. That is, the remote user may use as input to either leverager 340 or propagator 350 the information regarding, or copy of, merged database 336 that is delivered, transmitted, or otherwise provided to the remote location. The remote computer thus executes leverager 340 and/or propagator 350, but does not execute project identifier 310, parser-extractor 320, or aligner 330.

Leverager 340

As noted, leverager 340 leverages translations of translatable source segments provided by the parsing-extracting and aligning of legacy files. In particular, leverager 340 determines whether project identifier 310, parser-extractor 320, and aligner 330 have operated upon legacy files associated with a source file of source project 300, or if a merged legacy source-target database derived from a legacy source file associated with a source file of source project 300 is otherwise available. Such determination is made in accordance with any of a variety of known techniques, such as searching for data structures identified as merged source-target databases. If no such merged legacy source-target database are found, leverager 340 performs no functions and passes control to propagator 350.

In accordance with the previous illustrative example of FIG. 4B, it is assumed that leverager 340 has identified legacy files 408 associated with project source files 410A and 410D. Thus, leverager 340 operates upon the data structure into which aligner 330 has stored legacy source-target pairs; i.e., merged legacy source-target database 336-L referred to above. In particular, leverager 340 determines if a translatable source segment in merged source-target database 336 matches a translatable source segment in merged legacy source-target database 336-L. Such determination is made in accordance with any of a variety of known techniques, such as search and compare techniques. In the illustrated embodiment, such a match is assumed to be identified when the two translatable source segments are the same. In alternative embodiments, a match may be identified if the two are morphologically related (such as "File" and "Files"), but not the same.

If a match is found, then leverager 340 copies the corresponding target segment of such matching translatable source segment of legacy source files 408 into the corresponding target segment of the matched translatable source segment of database 336. In such manner, leverager 340 leverages the legacy data structure to provide a corresponding target segment for a matched translatable source segment. The leveraged version of database 336, i.e., database 336 as updated by leverager 340 to include corresponding target segments from corresponding legacy target files 409, is shown in FIG. 3 as leveraged source-target database 342.

Typically, database 342 has the same structure as database 336, and it is so assumed with respect to the illustrated embodiment. Therefore, for clarity, the same field labels are used herein to refer to the fields of database 342 as specified above with respect to database 336. For example, translatable source segments of database 342 are described as being stored in translatable-source-segment fields 410 of leveraged source-target database 342.

Propagator 350

As shown in FIG. 3, propagator 350 operates on leveraged source-target database 342, if such database has been generated by leverager 340, or otherwise on merged source-target database 336. For illustrative purposes, it will be assumed that propagator 350 operates on leveraged source-target database 342.

Propagator 350 associates all source-target pairs in database 342 having the same translatable source segment so that a corresponding target segment that is a translation of any occurrence of such translatable source segment may be propagated to all occurrences of corresponding target segments corresponding with such same source segments. (It will be understood that, in alternative embodiments, "same" may mean morphologically similar rather than equivalent.) Such association is accomplished by providing pointers from each source-target pair in database 342 to a particular page in pair-occurrence pointer book 1022. Such particular page is the one page of book 1022 in which are stored pointers back to all source-target pairs in database 342 having a common translatable source segment. For example, if a source-target pair in database 342 has the translatable source segment "Yes," then the record in database 342 in which that translatable source segment is stored has a pointer to a "Yes" page in book 1022. That is, stored in the "Yes" page, and only in the "Yes" page, are pointers back to all translatable source segments "Yes" in the source-target pairs of database 342. Such arrangement of pointers from database 342 to book 1022, and back again, is described in greater detail below in reference to FIG. 13.

Figure 10:
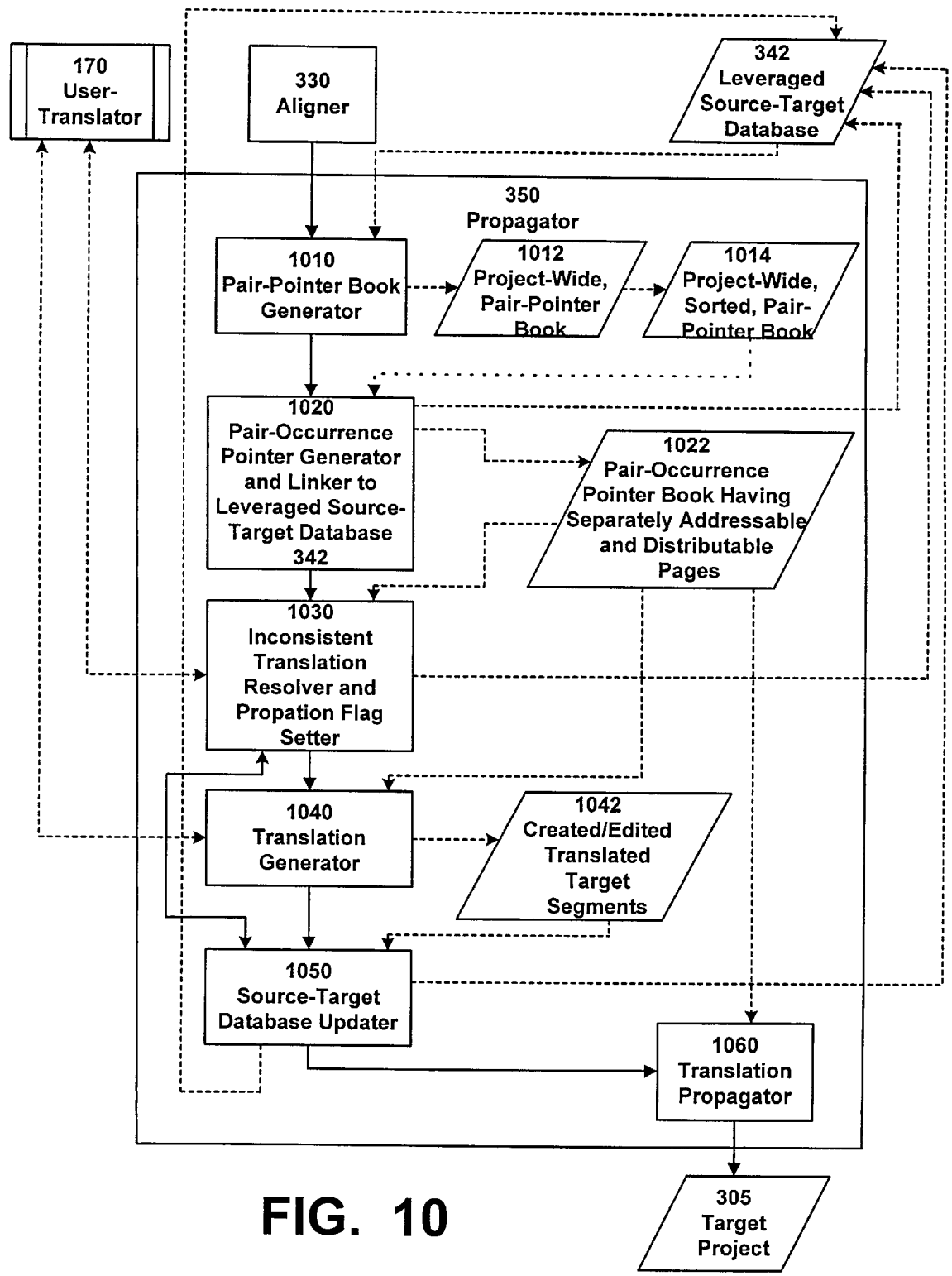
FIG. 10 is a functional block diagram of one embodiment of a propagator of the translation memory system of FIG. 3.

Advantageously, it is thus not necessary for user-translator 170 to provide a translation of each occurrence of each translatable source segment. Rather, such tasks may be performed once for each distinct translatable source segment, and the translation may optionally be propagated to all occurrences of the corresponding target segments. Moreover, because the entries in database 342 are independent of the file type or format from which they were derived, such propagation may take place irrespective of different file types and formats that may apply to the files of source project 300 and target project 305. FIG. 10 is a functional block diagram of one embodiment of propagator 350.

Figure 11:
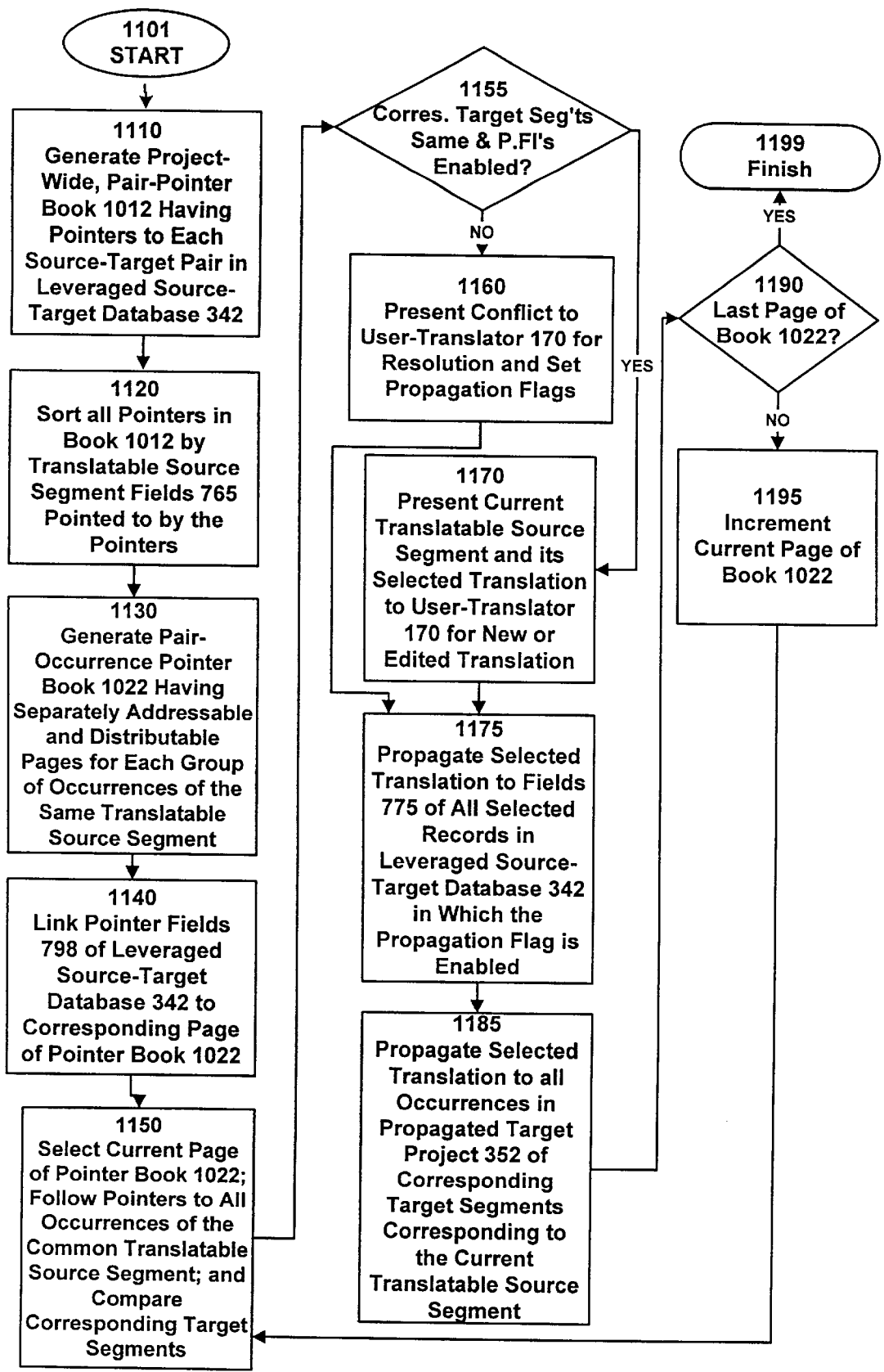
FIG. 11 is one embodiment of a flow diagram showing the steps by which the propagator of FIG. 10 operates.
Figure 12A:
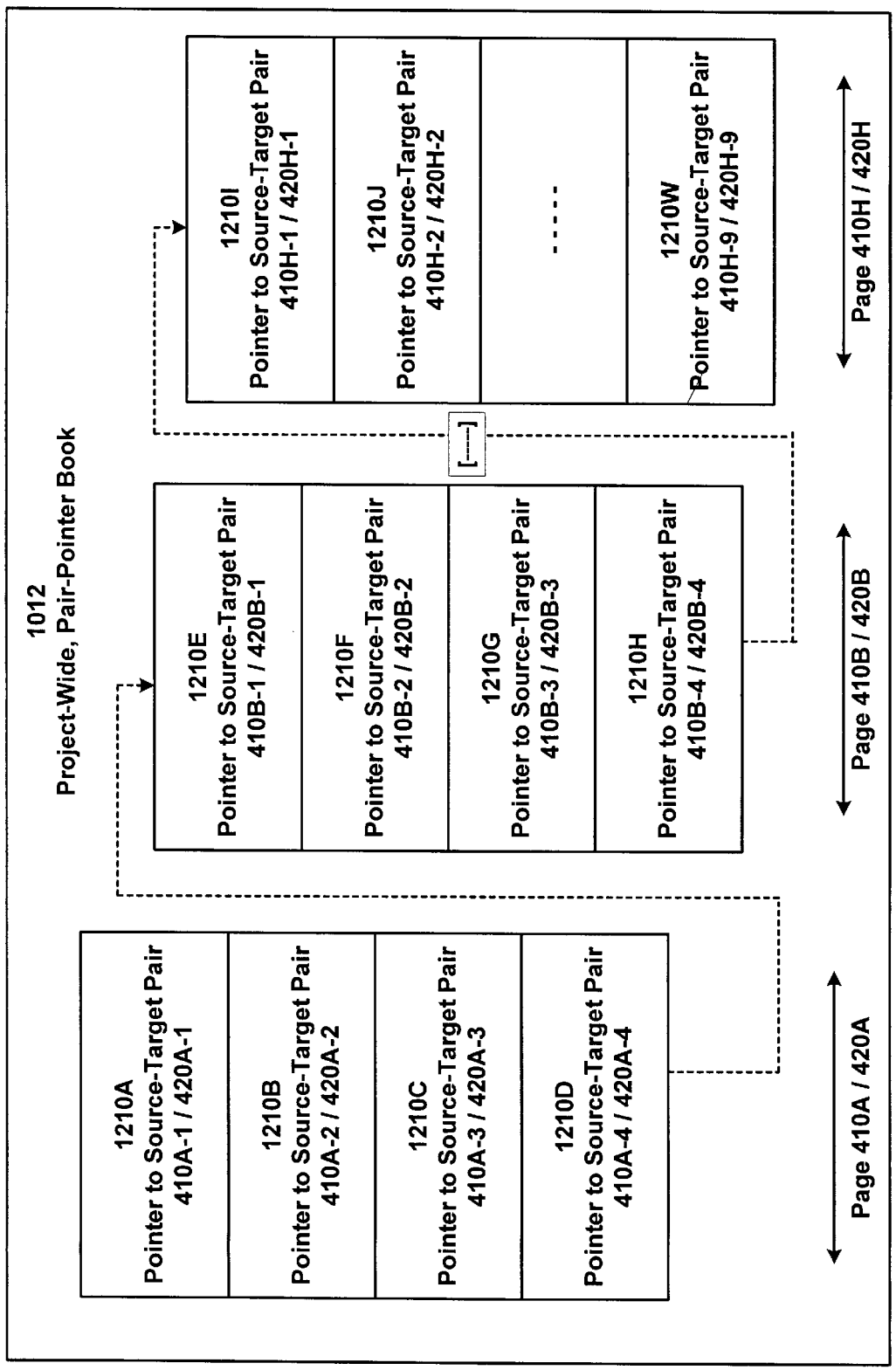
FIG. 12A is a partial schematic diagram of one illustrative embodiment of a project-wide, pair-pointer book into which one embodiment of a pair-pointer book generator of the propagator of FIG. 10 stores pointers to source-target pairs in records of a leveraged implementation of the merged source-target database of FIG. 7C.
Figures 12B, 12C:
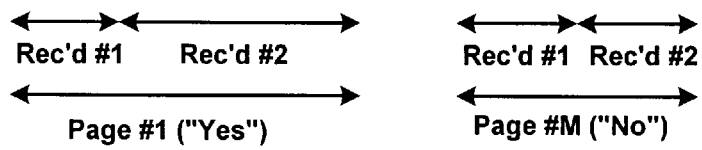
FIG. 12B is a partial schematic diagram of one illustrative embodiment of a sorted implementation of the project-wide, pair-pointer book of FIG. 12A.
FIG. 12C is a partial schematic diagram of one illustrative embodiment of a pair-occurrence pointer book having separately addressable and distributable pages generated by one embodiment of a pair-occurrence pointer generator of the propagator of FIG. 10.
Figure 13:
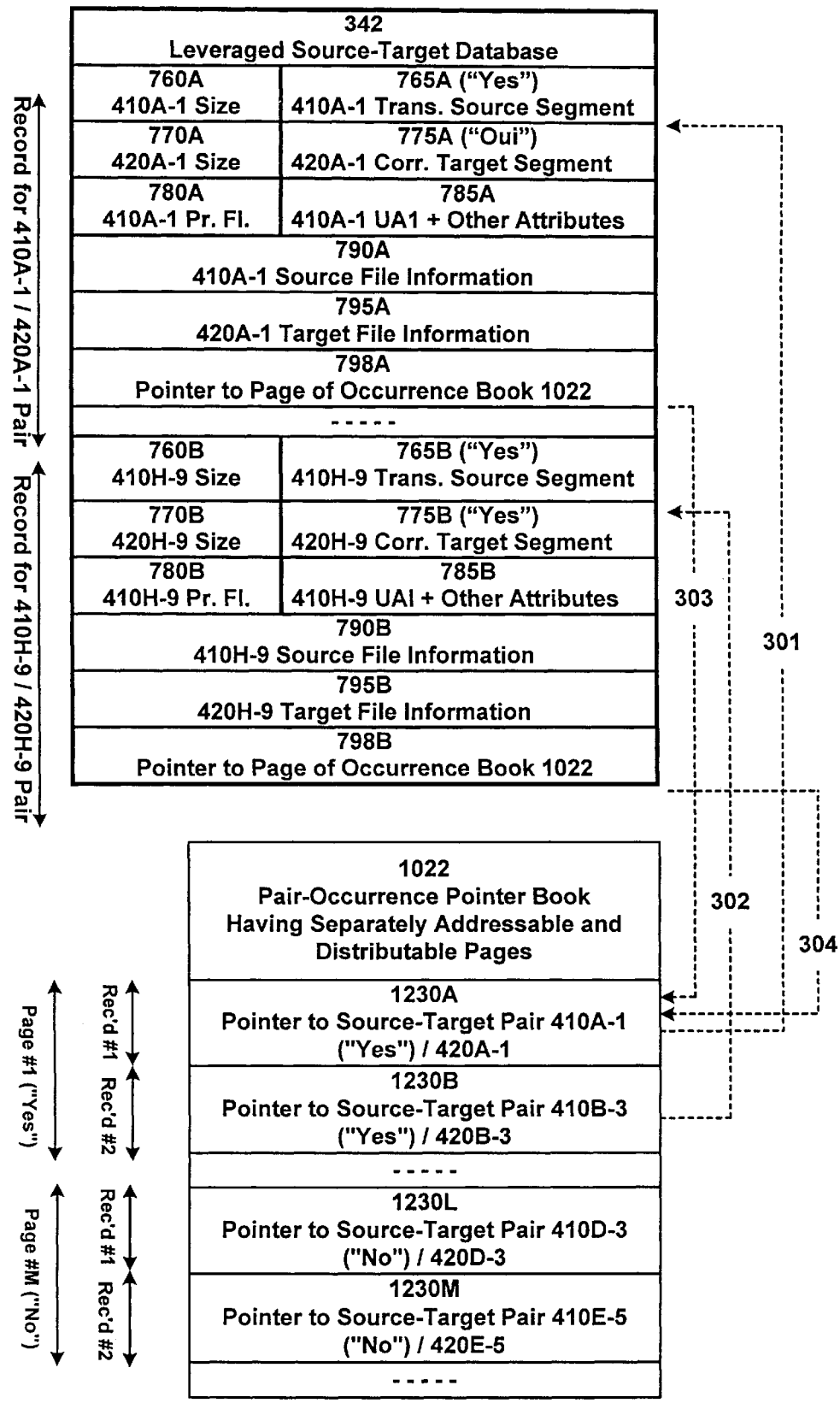
FIG. 13 is a partial schematic diagram of one illustrative embodiment of linkages between the pair-occurrence pointer book of FIG. 12C and the leveraged implementation of the merged source-target database of FIG. 7C.

An illustrative process by which propagator 350 may operate is shown in the flow diagram of FIG. 11. FIGS. 12A, 12B, and 12C show illustrative embodiments of data structures generated by propagator 350. FIG. 13 shows one implementation of pointers, and the data fields to which they point, in accordance with the operations of propagator 350.

As indicated in FIGS. 10 and 11, propagator 350 includes pair-pointer book generator 1010 that generates a data structure, referred to as project-wide pair-pointer book 1012. Book 1012 includes pages, each of which includes pointers to source-target pairs of leveraged source-target database 342 derived from the same pair of source and target files of source project 300 and target project 305, respectively. In the illustrated embodiment, such pointers point in particular to the translatable source segment of the source-target pair, but it need not be so in other implementations. (See function block 1110 of FIG. 11 and FIG. 13.) For example, as shown in FIG. 12A, one page of book 1012 includes pointers to source-target pairs stored in leveraged source-target database 342 and derived from source file 410A and corresponding target file 420A. Another page of book 1012 corresponds to source-target pairs from source file 410B and corresponding target file 420B, and so on. Book 1012 is "project-wide," meaning that it generally includes source-target pairs from all source files and target files of project 210. Generator 1010 generates the contents of book 1012 in accordance with any of a variety of known techniques, such as searching and sorting techniques, that may be applied to leveraged source-target database 342 to identify source-target pairs derived from the same pair of source and target files.

Generator 1010 also sorts the pointers in book 1012 so that they are grouped by the corresponding translatable source segments in fields 765 of database 342 to which they point. (See function block 1120 of FIG. 11.) For example, as shown in FIG. 12B, all project-wide generator 1010 groups together all pointers of book 1012 pointing to source-target pairs having the same translatable source segment "Yes." Such sorted grouping is shown in FIGS. 10 and 12B as "project-wide, sorted, pair-pointer book 1014." It will be understood that books 1012 and 1014, in alternative implementations, could be the same data structure.

Propagator 350 also includes function block 1020, labeled "pair-occurrence pointer generator and linker to leveraged source-target database 342." Generator 1020 operates upon book 1014 to generate data structure 1022, labeled "pair-occurrence pointer book having separately addressable and distributable pages." (See function block 1130 of FIG. 11.) The pair-occurrence pointer book of the illustrated embodiment is organized by generator 1020 into pages, each of which includes records that are pointers to the same translatable source segment. Thus, the grouping of pointers is similar to that of the illustrated embodiment of book 1014. (The linking functions of two of such pointers are shown by lines 301 and 302 of FIG. 13.)

Advantageously, however, generator 1020 organizes each page of book 1022, in accordance with any of a variety of known techniques, to be separately addressable and distributable. That is, each page may be separately provided to, and operated upon by, groups of users in differing locations using groups of computers (not shown) that need not be linked, as one illustrative example. Thus, for example, one user-translator may be working on translations of translatable source segments beginning with the letters A through C, at the same time as another, independent and separately located, user-translator is working on translations of translatable source segments beginning with the letters D through F. Other data structures that enable separate addressing and distribution could be employed in alternative implementations.

Generator 1020 also links pointer fields 798 of the records pointed to by the pointers of book 1022 back to the appropriate page of book 1022. (See function block 1140 of FIG. 11 and lines 303 and 304 of FIG. 13.) Thus, with respect to the illustrative example of FIG. 13, pointer 1230A points to field 765A, which is the translatable source segment "Yes" for the record of source-target pair 410A-1 and 420A-1 (see line 301). The pointer pointing back to the appropriate page of book 1022 is the pointer in field 798A, the function of which is shown by line 303. It is illustratively shown by line 303 that the pointer in field 798A points to the first record in such page, but it will be understood by those skilled in the relevant art that such pointer, in alternative embodiments, may point to a page header, or other page indicator.

Also included in propagator 350 is function block 1030, labeled "inconsistent translation resolver and propagation flag setter." Employing any of a variety of known techniques, resolver 1030 searches source-target pairs pointed to by the pointers in a particular page of book 1022, referred to for illustrative purposes as the "current page" of book 1022. As noted, all pointers of the current page of book 1022 point to translatable source segments in database 342 that are the same, such as the segment "Yes," referred to as the "current translatable source segment." In the illustrative example, resolver 1030 follows the pointers of the current page to all occurrences in source project 300 of the translatable source segment "Yes" in database 342. For each such occurrence, if propagation flag 780 for the corresponding record is on, resolver 1030 compares the corresponding target segment to the corresponding target segments of other occurrences of the "Yes" segment in records in which the propagation flag is also on. (See function block 1150.) Resolver 1030 identifies a conflict if any corresponding target segment of such same translatable source segments is different than any other such corresponding target segment. (See decision block 1155.) For example, a conflict is identified if one source-target pair pointed to in the current page of book 1022 includes the segments "Yes" and "Oui," while another source-target pair pointed to in the current page includes the segments "Yes" and "Non."

In the illustrated embodiment, resolver 1030 resolves the conflict by presenting the two or more differing translations to user-translator 170. (See function block 1160.) In alternative implementations, such conflict may be resolved automatically, i.e., without the involvement of user-translator 170. For example, resolver 1030 may apply an appropriate algorithm such as choosing the translation that is provided most frequently, or in a particular part of the hierarchical structure of the associated source file.

Assuming for illustrative purposes that the conflict is presented to user-translator 170, resolver 1030 also typically presents options to user-translator 170 for resolving the conflict. For example, a graphical user interface may be employed so that user-translator may choose one of the two or more differing corresponding target segments that are displayed. Such chosen segment is then adopted as the translation to be propagated to all occurrences, throughout target project 305, of the corresponding target segments corresponding to the displayed translatable source segment. For convenience, such chosen translation is referred to as the "selected translation." As described below, such propagation is done by source-target database updater 1050. As shown in FIG. 10, resolver 1030 thus passes control to updater 1050 to implement the propagation with respect to the current translatable source segment (i.e., with respect to the current page of book 1022). In the illustrated embodiment, updater 1050 then passes control back to resolver 1030 so that it may operate on another translatable source segment associated with another page of book 1022. (See decision block 1190 and function block 1195 of FIG. 11.) In alternative implementations, resolver 1030 may operate on two or more pages of book 1022 and updater 1050 may then propagate the resulting selected translations.

Resolver 1030 optionally may present other choices to user-translator 170 to resolve a conflict. For example, user-translator 170 may choose to leave the conflict unresolved as to all differing corresponding target segments, or unresolved as to a specified portion of them. For purposes of providing the following exemplary illustrations, it is assumed that the current page, of book 1022 includes pointers to the following four source-target pairs: Yes/Oui, Yes/Non, Yes/OK, and Yes/Oui.

It is first assumed that user-translator 170 indicates that all four translations should be retained, wherein such choice is indicated in accordance with any of a variety of known techniques, such as checking a box on a graphical user interface. Resolver 1030 accesses the records in database 342 having the current translatable source segment "Yes" pointed to by the pointers of the current page. In the illustrated embodiment, resolver 342 determines which of the corresponding target segments appears most frequently, and selects it to be the selected translation. Thus, in the illustrative case, the segment "Oui," is so selected. If two or more corresponding target segments appear most frequently, resolver 342 arbitrarily chooses one, or, in alternative implementations, employs another criterion such as hierarchical order. For convenience, the records of database 342 in which the selected corresponding target segments appear are referred to as the "selected records" and the records of the non-selected corresponding target segments are referred to as the "non-selected records." Resolver 342 sets the propagation flag fields 780 of the non-selected records to a state indicating that propagation is not enabled with respect to those records (hereafter, the "disabled" state). Thus, as described below, updater 1050 does not propagate changes to corresponding target segments in fields 775 of such records; i.e., they remain "Non," and "OK."

It is now assumed that user-translator 170 indicates that all occurrences of "Non" as a translation of "Yes" should be changed to "Oui," but that all occurrences of "OK" as a translation should be retained. Resolver 342 thus disables the propagation flag fields 780 of the records having "Non" in fields 775. Because, as noted, it is assumed in the illustrated embodiment that the default value of propagation flag fields 780 is the enabled state, such fields 780 of the selected records having "Oui" or "OK" in fields 775 remain enabled.

As another example, it is assumed that user-translator 170 designates "Oui" as the selected translation and indicates that such translation should replace all occurrences in which "Yes" is otherwise translated. Resolver 342 thus leaves propagation flag fields 780 in their default, i.e., enabled, state.

Propagator 350 further includes translation generator and propagation flag setter 1040. Generator 1040 presents the current translatable source segment and its selected translation to user-translator 170. (See function block 1170.) In the illustrated embodiment, translation generator 1040 operates upon only one such source-target pair, such as Yes/Oui of the present example, for the current page of book 1022. As described above, there is only one such pair because either: (a) all source-target pairs in project 210 having the current translatable source segment are the same (see "yes" outcome of decision block 1155), or (b) if they are not the same, resolver 1030 has identified a selected translation to be paired with the current translatable source segment.

User-translator 170 may edit or replace the selected translation so presented. For example, the translation "Oui" may be replaced with the translation "OK," or any other segment determined by user-translator 170. The selected translation may also be left unchanged. The replacement, edited, or unchanged translation is received by translation generator 1040 in accordance with any of a variety of known techniques, such as enabling user-translator 170 to enter changes, or to verify the current translation, on a graphical user interface.

As noted, propagator 350 also includes source-target database updater 1050. In the illustrated embodiment, updater 1050 propagates the selected translation to fields 775 of all selected records in database 342 in which the propagation flag is enabled. (See function block 1175.) Thus, updater 1050 updates database 342 so that all corresponding target fields 775 in records pointed to by the pointers of the current page of book 1022 contain the selected translation, provided that the propagation flag of the record is enabled. With respect to the previous example of four source-target pairs in four such records, and assuming that user-translator 170 has indicated that all occurrences of "Yes" should be changed to "Oui," the four fields 775 of those records are changed to "Oui."

Also included in propagator 350 is translation propagator 1060 that propagates the selected translation to appropriate records of target files in target project 305. In the illustrated embodiment, translation propagator 1060 identifies such appropriate records by: (a) following one pointer of the current page of book 1022 to a current record of database 342, (b) determining if the propagation flag field 780 of such current record is enabled, (c) if it is not enabled, go to step (d), and if it is enabled, change the corresponding target segment in target project 305 to the selected translation, and (d) similarly process another pointer in the current page until all such pointers are so processed. As noted, another page of book 1022 is then processed until all such pages have been processed.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. The functions of modules may be carried out in various ways in alternative embodiments. For example, numerous variations are contemplated in accordance with the present invention to parse and extract segments, or to interface with user-translator 170.

Also, there are many possible variations of the architecture for all of the data structures described above, including variations in techniques for pointing, linking, storing flags or other information, and so on. In particular, but without limitation, in some embodiments separate target files need not be maintained. Rather, source files and target files may be combined in one group of files, or target files may overwrite or replace source files. More generally, any of the data structures described above may be combined in one or more data structure, and elements thereof may replace or overwrite other elements in accordance with any of a variety of known techniques. It will be evident to those skilled in the relevant art that-such, and other, data structures may be stored in main memory 130, memory storage device 150, or another device for storing data. As will also be evident to those skilled in the relevant art, the values in data structures generally are initialized or re-initialized in accordance with any of a variety of known techniques to provide that such values are accurate. Such initializations or re-initializations of data structures therefore are assumed, but may not be further described, for the various data structures, including flags, of the illustrated embodiment or alternative embodiments.

In addition, it will be understood by those skilled in the relevant art that control and data flows between and among functional modules of the invention and various data structures may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various described data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. A computer program product comprising a computer-readable medium having encoded therein program instructions which when executed by a computer under control of an appropriate operating system provide a translation memory system that translates translatable source segments in one or more source files of a source project, including program instructions which, when executed, provide a propagation tool that propagates an externally produced translation of a first occurrence of a translatable source segment in a first source file to at least one occurrence of a corresponding target segment in one or more target files of a target project, wherein the corresponding target segment corresponds with a second occurrence of the translatable source segment in any of the one or more source files.

2. The computer program product of claim 1, wherein the source files have a same file format.

3. The computer program product of claim 1, wherein:
at least one source file has a file format different than that of at least one other source file.

4. The computer program product of claim 1, wherein:
at least one source file has a character format different than that of at least one other source file.

5. The computer program product of claim 1, wherein:
at least one source file has text written in a different language than that of at least one other source file.

6. The computer program product of claim 1, wherein:
the propagation tool is constructed and arranged to propagate the externally produced translation to all corresponding target segments in the target project that correspond with the translatable source segment.

7. The computer program product of claim 1, wherein:
the propagation tool is constructed and arranged to propagate the externally produced translation to at least one user-selected corresponding target segment in the target project that corresponds with the translatable source segment.

8. The computer program product of claim 1, wherein:
the externally produced translation is provided to the propagation tool only once.

9. The computer program product of claim 1, wherein:
the externally produced language translation is generated by a human translator.

10. The computer program product of claim 1, wherein:
the externally produced language translation is generated by a machine translation tool.

11. The computer program product of claim 1, wherein:
the externally produced language translation is derived from a legacy file.

12. The computer program product of claim 1, wherein:
the externally produced language translation is derived from a corresponding target segment that corresponds with the translatable source segment.

13. A translation memory system for translating translatable source segments in one or more source files of a source project, the system comprising a computer executing a program which provides a propagation tool which propagates an externally produced translation of a first occurrence of a translatable source segment in a first source file to at least one occurrence of a corresponding target segment in one or more target files of a target project, wherein the corresponding target segment corresponds with a second occurrence of the translatable source segment in any of the one or more source files.

14. The translation memory system of claim 13, wherein:
at least one source file has a file format different than that of at least one other source file.

15. The translation memory system of claim 13, wherein:
the externally produced translation is propagated to all corresponding target segments in the target project that correspond with the translatable source segment.

16. The translation memory system of claim 13, wherein:
the externally produced translation is propagated to at least one user-selected corresponding target segment in the target project that corresponds with the translatable source segment.

17. The translation memory system of claim 13, wherein:
the externally produced language translation is derived from a corresponding target segment that corresponds with the translatable source segment.

18. A translation memory system having a computer and a program executed by the computer for translating translatable source segments in one or more source files of a source project and storing the translated translatable source segments in corresponding target segments of one or more target files of a target project, further including a propagation tool program executing on the computer to associate at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least source-target pairs are sufficiently similar to each other that they are translated by a same externally produced translation.

19. The translation memory system of claim 18, wherein:
a plurality of the sufficiently similar translatable source segments are the same.

20. The translation memory system of claim 18, wherein:
a plurality of the sufficiently similar translatable source segments are morphologically similar.

21. The translation memory system of claim 18, wherein:
the propagation tool program includes instructions to propagate an externally produced translation of the translatable source segment to each corresponding target segment that is paired with the translatable source segment in one or more of the plurality of source-target pairs.

22. The translation memory system of claim 18, wherein:
the at least one associated source-target pairs are associated by at least one first pointer that points from each associated source-target pair to a page in a pair-occurrence pointer book having one or more pages, each page having one or more second pointers that each point back to one associated source-target pair, wherein the translatable source segments of each associated source-target pair pointed to by each of the one or more second pointers of each page are sufficiently similar to each other that they are translated by a same externally produced translation.

23. The translation memory system of claim 22, wherein:
each sufficiently similar translatable source segment is the same as every other sufficiently similar translatable source segment.

24. The translation memory system of claim 22, wherein:
each page is separately addressable by each of a plurality of user-translators.

25. The translation memory system of claim 22, wherein:
each page is separately distributable to each of a plurality of user-translators.

26. The translation memory system of claim 18, wherein:
each source-target pair is stored in a record of the at least one source-target database, each record having an indicator indicating when an externally produced translation of the translatable source segment of the record is to be propagated to the corresponding target segment of the record.

27. The translation memory system of claim 18, wherein:
each source-target pair is stored in a record of the at least one source-target database, each record having a first pointer to a page in a pair-occurrence pointer book having one or more pages, each page having one or more second pointers that each point back to one of the associated source-target-pair records, wherein the translatable source segments of each associated source-target-pair record pointed to by each of the one or more second pointers of each page are sufficiently similar to each other that they are translated by a same externally produced translation.

28. The translation memory system of claim 27, wherein:
each sufficiently similar translatable source segment is the same as every other sufficiently similar translatable source segment.

29. The translation memory system of claim 18, comprising:
a leverager constructed and arranged to match at least one legacy translatable source segment in a legacy file with at least one translatable source segment in the at least one source-target database, and
generate a corresponding target segment that corresponds with the at least one translatable source segment, wherein the generated corresponding target segment is a copy of a legacy corresponding target segment that corresponds with the at least one legacy translatable source segment.

30. The translation memory system of claim 18, comprising:
a pair-pointer book generator constructed and arranged to generate a pair-occurrence pointer book having one or more separately addressable and distributable pages, each page having one or more pointers that each point to one source-target pair, wherein each translatable source segment of each source-target pair pointed to by each of the one or more pointers of each page is the same.

31. A translation memory system having a computer and a program executed by the computer for translating translatable source segments in one or more source files of a source project and storing the translated translatable source segments in corresponding target segments of one or more target files of a target project, further including a propagation tool program executing on the computer to associate at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least source-target pairs are sufficiently similar to each other that they are translated by a same externally produced translation; a pair-pointer book generator constructed and arranged to generate a pair-occurrence pointer book having one or more separately addressable and distributable pages, each page having one or more pointers that each point to one source-target pair, wherein each translatable source segment of each source-target pair pointed to by each of the one or more pointers of each page is the same; and an inconsistent translation resolver and propagation flag setter constructed and arranged to search each source-target pair pointed to by each pointer in at least one page and to identify a conflict when a first corresponding target segment of a first source-target pair pointed to by a first pointer of a first page of the at least one page is different than a second corresponding target segment of a second source-target pair pointed to by a second pointer of the first page, and user-determined propagation indicators associated with the first and second source target pairs are enabled, wherein the propagation indicator indicates when an externally produced translation of the translatable source segment of the record is to be propagated to the corresponding target segment of the record.

32. A translation memory system having a computer and a program executed by the computer for translating translatable source segments in one or more source files of a source project and storing the translated translatable source segments in corresponding target segments of one or more target files of a target project, further including a propagation tool program executing on the computer to associate at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least source-target pairs are sufficiently similar to each other that they are translated by a same externally produced translation; a pair-pointer book generator constructed and arranged to generate a pair-occurrence pointer book having one or more separately addressable and distributable pages, each page having one or more pointers that each point to one source-target pair, wherein each translatable source segment of each source-target pair pointed to by each of the one or more pointers of each page is the same; and an inconsistent translation resolver and propagation flag setter constructed and arranged to search each source-target pair pointed to by each pointer in at least one page and to identify a conflict when a first corresponding target segment of a first source-target pair pointed to by a first pointer of a first page of the at least one page is different than a second corresponding target segment of a second source-target pair pointed to by a second pointer of the first page.

33. The propagation tool of claim 32, wherein:
the inconsistent translation resolver and propagation flag setter sets the second corresponding target segment to be the same as the first corresponding target segment based upon a user selection of the first corresponding target segment.

34. A method for translating translatable source segments in one or more source files of a source project to generate corresponding target segments of one or more target files of a target project, comprising:

(1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;

(2) propagating an externally produced translation of the translatable source segment to each corresponding target segment that is paired with the translatable source segment in one or more of the plurality of source-target pairs.

35. A method for translating translatable source segments in one or more source files of a source project to generate corresponding target segments of one or more target files of a target project, comprising:

(1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation; and (2) propagating an externally produced translation of the translatable source segment to each corresponding target segment that is paired with the translatable source segment in one or more of the plurality of source-target pairs; wherein the step of associating comprises:

(a) generating at least one first pointer to associate the at least one associated source-target pairs, wherein the first pointer points from each associated source-target pair to a page in a pair-occurrence pointer book having one or more pages; and (b) generating for each page one or more second pointers that each point back to one associated source-target pair, wherein the translatable source segments of each associated source-target pair pointed to by each of the one or more second pointers of each page are sufficiently similar to each other that they are translated by a same externally produced translation.

36. The method of claim 35, wherein:
each page is separately addressable by each of a plurality of user-translators.

37. The method of claim 34, further comprising:
(3) storing each source-target pair in a record of the at least one source-target database; and
(4) generating for each record an indicator indicating when an externally produced translation of the translatable source segment of the record is to be propagated to the corresponding target segment of the record.

38. The method of claim 34, further comprising:
(3) storing each source-target pair in a record of the at least one source-target database; and
(4) generating for each record a first pointer to a page in a pair-occurrence pointer book having one or more pages, each page having one or more second pointers that each point back to one of the associated source-target-pair records, wherein the translatable source segments of each associated source-target-pair record pointed to by each of the one or more second pointers of each page are sufficiently similar to each other that they are translated by a same externally produced translation.

39. The method of claim 34, further comprising:
   (3) matching at least one legacy translatable source segment in a legacy file with at least one translatable source segment in the at least one source-target database, and
   (4) generating a corresponding target segment that corresponds with the at least one translatable source segment, wherein the generated corresponding target segment is a copy of a legacy corresponding target segment that corresponds with the at least one legacy translatable source segment.

40. The method of claim 34, further comprising:
   (3) generating a pair-occurrence pointer book having one or more separately addressable and distributable pages, each page having one or more pointers that each point to one source-target pair, wherein each translatable source segment of each source-target pair pointed to by each of the one or more pointers of each page is the same.

41. A method for translating translatable source segments in one or more source files of a source project to generate corresponding target segments of one or more target files of a target project, comprising:
   (1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;
   (2) propagating an externally produced translation of the translatable source segment to each corresponding target segment that is paired with the translatable source segment in one or more of the plurality of source-target pairs;
   (3) generating a pair-occurrence pointer book having one or more separately addressable and distributable pages, each page having one or more pointers that each point to one source-target pair, wherein each translatable source segment of each source-target pair pointed to by each of the one or more pointers of each page is the same;
   (4) searching each source-target pair pointed to by each pointer in at least one page; and
   (5) identifying a conflict when a first corresponding target segment of a first source-target pair pointed to by a first pointer of a first page of the at least one page is different than a second corresponding target segment of a second source-target pair pointed to by a second pointer of the first page.

42. The method of claim 41, wherein step (5) further comprises:
   (a) determining when a user-determined propagation indicator associated with the second source target pair is enabled, wherein the propagation indicator indicates when an externally produced translation of the translatable source segment of the record is to be propagated to the corresponding target segment of the record; and
   (b) setting the second corresponding target segment to be the same as the first corresponding target segment based upon a user selection of the first corresponding target segment.

43. A computer system having at least one processor and a propagation tool constructed and arranged to cooperate with the at least one processor to propagate an externally produced translation of a first occurrence of a translatable source segment in a first source file to at least one occurrence of a corresponding target segment in one or more target files of a target project, wherein the corresponding target segment corresponds with a second occurrence of the translatable source segment in any of the one or more source files.

44. A computer system having at least one processor and a computer program executed by said processor such that execution of the program provides a translation memory system to translate translatable source segments in one or more source files of a source project and store the translated translatable source segments in corresponding target segments of one or more target files of a target project, wherein the translation memory system includes a propagation tool constructed and arranged to associate at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation.

45. The computer system of claim 44, wherein:
   a plurality of the sufficiently similar translatable source segments are the same.

46. The computer system of claim 44, wherein:
   the propagation tool is constructed and arranged to propagate an externally produced translation of the translatable source segment to each corresponding target segment that is paired with the translatable source segment in one or more of the plurality of source-target pairs.

47. The computer system of claim 44, wherein:
   the at least one associated source-target pairs are associated by at least one first pointer that points from each associated source-target pair to a page in a pair-occurrence pointer book having one or more separately addressable and deliverable pages, each page having one or more second pointers that each point back to one associated source-target pair, wherein the translatable source segments of each associated source-target pair pointed to by each of the one or more second pointers of each page are sufficiently similar to each other that they are translated by a same externally produced translation.

48. The computer system of claim 44, wherein:
   each source-target pair is stored in a record of the at least one source-target database, each record having an indicator indicating when an externally produced translation of the translatable source segment of the record is to be propagated to the corresponding target segment of the record.

49. The computer system of claim 44, wherein:
   each source-target pair is stored in a record of the at least one source-target database, each record having a first pointer to a page in a pair-occurrence pointer book having one or more pages, each page having one or more second pointers that each point back to one of the associated source-target-pair records, wherein the translatable source segments of each associated source-target-pair record pointed to by each of the one or more second pointers of each page are sufficiently similar to each other that they are translated by a same externally produced translation.

50. Storage media that contains software that, when executed on an appropriate computing system, performs a method for translating translatable source segments in one or more source files of a source project to generate corresponding target segments of one or more target files of a target project, the method comprising:
   (1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;
   (2) propagating an externally produced translation of the translatable source segment to each corresponding target segment that is paired with the translatable source segment in one or more of the plurality of source-target pairs.

51. Storage media that contains software that, when executed on an appropriate computing system, performs a method for translating translatable source segments in one or more source files of a source project to generate corresponding target segments of one or more target files of a target project, the method comprising:
   (1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;
   (2) propagating an externally produced translation of the translatable source segment to each corresponding target segment that is paired with the translatable source segment in one or more of the plurality of source-target pairs; and the step of associating comprising
      (a) generating at least one first pointer to associate the at least one associated source-target pairs, wherein the first pointer points from each associated source-target pair to a page in a pair-occurrence pointer book having one or more pages; and
      (b) generating for each page one or more second pointers that each point back to one associated source-target pair, wherein the translatable source segments of each associated source-target pair pointed to by each of the one or more second pointers of each page are sufficiently similar to each other that they are translated by a same externally produced translation.

52. The storage media of claim 51, wherein:
   each page is separately addressable by each of a plurality of user-translators.

53. The storage media of claim 50, wherein the method further comprises:
   (3) storing each source-target pair in a record of the at least one source-target database; and
   (4) generating for each record an indicator indicating when an externally produced translation of the translatable source segment of the record is to be propagated to the corresponding target segment of the record.

54. The storage media of claim 50, wherein the method further comprises:
   (3) storing each source-target pair in a record of the at least one source-target database; and
   (4) generating for each record a first pointer to a page in a pair-occurrence pointer book having one or more pages, each page having one or more second pointers that each point back to one of the associated source-target-pair records, wherein the translatable source segments of each associated source-target-pair record pointed to by each of the one or more second pointers of each page are sufficiently similar to each other that they are translated by a same externally produced translation.

55. A computer program product for use with an appropriate computing system, the computer program product comprising a computer usable medium having embodied therein computer readable program code method steps for translating translatable source segments in one or more source files of a source project to generate corresponding target segments of one or more target files of a target project, the method steps comprising:
   (1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;
   (2) propagating an externally produced translation of the translatable source segment to each corresponding target segment that is paired with the translatable source segment in one or more of the plurality of source-target pairs.

56. A computer program product for use with an appropriate computing system, the computer program product comprising a computer usable medium having embodied therein computer readable program code method steps for translating translatable source segments in one or more source files of a source project to generate corresponding target segments of one or more target files of a target project, the method steps comprising:
   (1) associating at least one of a plurality of source-target pairs in at least one source-target database, wherein each source-target pair includes a translatable source segment and a corresponding target segment, wherein the corresponding target segment corresponds with the translatable source segment, and wherein all translatable source segments of the associated at least one source-target pairs are sufficiently similar to each other that they are translated by a same externally produced translation;
   (2) propagating an externally produced translation of the translatable source segment to each corresponding target segment that is paired with the translatable source segment in one or more of the plurality of source-target pairs; wherein the step of associating comprises:
      (a) generating at least one first pointer to associate the at least one associated source-target pairs, wherein the first pointer points from each associated source-target pair to a page in a pair-occurrence pointer book having one or more pages; and (b) generating for each page one or more second pointers that each point back to one associated source-target pair, wherein the translatable source segments of each associated source-target pair pointed to by each of the one or more second pointers of each page are sufficiently similar to each other that they are translated by a same externally produced translation.

57. The computer program product of claim 55, wherein: each page is separately addressable by each of a plurality of user-translators.

58. The computer program product of claim 55, wherein the method steps further comprise:
- (3) storing each source-target pair in a record of the at least one source-target database; and
- (4) generating for each record an indicator indicating when an externally produced translation of the translatable source segment of the record is to be propagated to the corresponding target segment of the record.

59. The computer program product of claim 55, wherein the method steps further comprise:
- (3) storing each source-target pair in a record of the at least one source-target database; and
- (4) generating for each record a first pointer to a page in a pair-occurrence pointer book having one or more pages, each page having one or more second pointers that each point back to one of the associated source-target-pair records, wherein the translatable source segments of each associated source-target-pair record pointed to by each of the one or more second pointers of each page are sufficiently similar to each other that they are translated by a same externally produced translation.

* * * * *